US010868997B2

(12) United States Patent
Teruuchi et al.

(10) Patent No.: US 10,868,997 B2
(45) Date of Patent: Dec. 15, 2020

(54) RECORDING CONTROL DEVICE, RECORDING APPARATUS, RECORDING CONTROL METHOD, AND RECORDING CONTROL PROGRAM

(71) Applicant: JVC KENWOOD Corporation, Yokohama (JP)

(72) Inventors: Takuji Teruuchi, Yokohama (JP); Akinori Sugata, Yokohama (JP); Tsuneo Satomi, Yokohama (JP); Toshio Mori, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/365,407

(22) Filed: Mar. 26, 2019

(65) Prior Publication Data

US 2019/0222797 A1    Jul. 18, 2019

Related U.S. Application Data

(63) Continuation of application No. PCT/JP2018/000368, filed on Jan. 10, 2018.

(30) Foreign Application Priority Data

May 10, 2017  (JP) .................................. 2017-093732
Jun. 26, 2017  (JP) .................................. 2017-124274

(51) Int. Cl.
*H04N 5/77* (2006.01)
*G11B 20/10* (2006.01)
(Continued)

(52) U.S. Cl.
CPC .............. *H04N 5/772* (2013.01); *G07C 5/00* (2013.01); *G07C 5/04* (2013.01);
(Continued)

(58) Field of Classification Search
CPC .......... H04N 5/772; H04N 5/232; H04N 5/91; H04N 7/183; G07C 5/00; G07C 5/04; G11B 20/10527; G11B 27/22
(Continued)

(56) References Cited

U.S. PATENT DOCUMENTS 6,324,450 B1    11/2001  Iwama
2005/0216172 A1*  9/2005  Schroder ................ G08G 1/167
                                                              701/96

(Continued)

FOREIGN PATENT DOCUMENTS

DE    19939468 A1    2/2001
EP    2000394 A2    12/2008
(Continued)

*Primary Examiner* — Thai Q Tran
*Assistant Examiner* — Nienru Yang
(74) *Attorney, Agent, or Firm* — Procopio, Cory, Hargreaves & Savitch LLP

(57) ABSTRACT

A recording control device includes: a video data acquisition unit configured to acquire data on a video obtained by shooting an outside of a vehicle; a buffer memory configured to temporarily store the data on the video; an event detection unit configured to detect occurrence of a predetermined event; a traveling information acquisition unit configured to acquire traveling information on the vehicle; and a recording control unit configured to determine a first period based on the traveling information and to record the data on the video, among the data on the video stored in the buffer memory, obtained from a time point as far back as the first period before the time point of detection of the event until a time point at which a second period has passed since the time point of detection of the event.

6 Claims, 19 Drawing Sheets

(51) Int. Cl.
  *G07C 5/04* (2006.01)
  *H04N 7/18* (2006.01)
  *G11B 27/22* (2006.01)
  *H04N 5/91* (2006.01)
  *H04N 5/232* (2006.01)
  *G07C 5/00* (2006.01)
(52) U.S. Cl.
  CPC ........ *G11B 20/10527* (2013.01); *G11B 27/22* (2013.01); *H04N 5/232* (2013.01); *H04N 5/91* (2013.01); *H04N 7/183* (2013.01)
(58) Field of Classification Search
  USPC ....................................................... 386/228
  See application file for complete search history.

(56) References Cited

U.S. PATENT DOCUMENTS

| | | | |
|---|---|---|---|
| 2010/0201819 A1 | 8/2010 | Minowa | |
| 2017/0148237 A1* | 5/2017 | Iwaasa | G07C 5/0841 |
| 2017/0361709 A1* | 12/2017 | Plante | B60K 35/00 |

FOREIGN PATENT DOCUMENTS

| | | | | |
|---|---|---|---|---|
| EP | 1764749 B1 * | 1/2011 | | G07C 5/085 |
| JP | 2001-106123 A | 4/2001 | | |
| JP | 2007-011815 A | 1/2007 | | |
| JP | 2016-009202 A | 1/2016 | | |

* cited by examiner

| TRAVELING VELOCITY ( v ) | FIRST PERIOD (p1) | SECOND PERIOD (p2) |
|---|---|---|
| LESS THAN 60 km/h ( v <V1 ) | 10 SECONDS (Ps) | 10 SECONDS (Pe) |
| EQUAL TO OR MORE THAN 60 km/h ( v ≧V1 ) | 20 SECONDS (Pf) | 10 SECONDS (Pe) |

Fig. 3

| TRAVELING VELOCITY ( v ) | FIRST PERIOD (p1) | SECOND PERIOD (p2) |
|---|---|---|
| LESS THAN 60 km/h ( v <V1 ) | 10 SECONDS (Ps) | 10 SECONDS (Pe) |
| EQUAL TO OR MORE THAN 60 km/h AND LESS THAN 80 km/h ( V1≦ v <V2 ) | 20 SECONDS (Pm) | 10 SECONDS (Pe) |
| EQUAL TO OR MORE THAN 80 km/h ( v ≧V2 ) | 30 SECONDS (Pf) | 10 SECONDS (Pe) |

Fig. 5

| TRAVELING ROAD TYPE (r) | FIRST PERIOD (p1) | SECOND PERIOD (p2) |
| --- | --- | --- |
| GENERAL ROAD ( r =0 ) | 10 SECONDS (Ps) | 10 SECONDS (Pe) |
| ARTERIAL HIGHWAY ( r =1 ) | 20 SECONDS (Pm) | 10 SECONDS (Pe) |
| EXPRESSWAY ( r =2 ) | 30 SECONDS (Pf) | 10 SECONDS (Pe) |

Fig. 7

| INTER-VEHICLE DISTANCE ( d ) | FIRST PERIOD (t1) | SECOND PERIOD (t2) |
|---|---|---|
| EQUAL TO OR MORE THAN 15m (d ≧ D1) | 10 SECONDS (Ps) | 10 SECONDS (Pe) |
| EQUAL TO OR MORE THAN 7m AND LESS THAN 15m (D2 ≦ d < D1) | 20 SECONDS (Pm) | 10 SECONDS (Pe) |
| LESS THAN 7m (d < D2) | 30 SECONDS (Pf) | 10 SECONDS (Pe) |

Fig. 9

| TRAVELING VELOCITY (v) | INTER-VEHICLE DISTANCE (d) | FIRST PERIOD (t1) | SECOND PERIOD (t2) |
|---|---|---|---|
| LESS THAN 30 km/h ($v < V1$) | NOT APPLICABLE | 10 SECONDS (Ps) | 10 SECONDS (Pe) |
| EQUAL TO OR MORE THAN 30 km/h ($v \geq V1$) | EQUAL TO OR MORE THAN 15m ($d \geq D1$) | 10 SECONDS (Ps) | 10 SECONDS (Pe) |
| | EQUAL TO OR MORE THAN 7m AND LESS THAN 15m ($D2 \leq d < D1$) | 20 SECONDS (Pm) | 10 SECONDS (Pe) |
| | LESS THAN 7m ($d < D2$) | 30 SECONDS (Pf) | 10 SECONDS (Pe) |

Fig. 12

| STATE OF DRIVER ASSISTANCE FUNCTION ( AST ) | FIRST PERIOD (p1) | SECOND PERIOD (p2) |
|---|---|---|
| DRIVER ASSISTANCE FUNCTION IS OFF ( AST:OFF ) | 10 SECONDS (Ps) | 10 SECONDS (Pe) |
| DRIVER ASSISTANCE FUNCTION IS ON ( AST:ON ) | 60 SECONDS (Pf) | 10 SECONDS (Pe) |

Fig. 15

RECORDING CONTROL DEVICE, RECORDING APPARATUS, RECORDING CONTROL METHOD, AND RECORDING CONTROL PROGRAM

CROSS REFERENCE TO RELATED APPLICATION

The present application is a bypass continuation of International Application No. PCT/JP2018/000368, filed on Jan. 10, 2018, which is based upon and claims the benefit of priority from Japanese Patent Application No. 2017-093732, filed on May 10, 2017, and Japanese Patent Application No. 2017-124274, filed on Jun. 26, 2017, the disclosure of which are incorporated herein in its entirety by reference.

BACKGROUND

The present invention relates to a recording control device, a recording apparatus, a recording control method, and a recording control program.

A driving recorder that records driving information on an automobile records video and audio of the inside and outside of a vehicle by using a camera mounted on the vehicle, along with the location, velocity, traveled distance, and the like of the vehicle. The driving recorder records the information for purposes including management of safe driving of the vehicle, giving a reminder to a driver, and storing video before and after occurrence of an accident as evidence.

For example, Japanese Unexamined Patent Application Publication No. 2016-009202 proposes a driving recorder that includes means for storing video based on information inputted from an acceleration sensor and an audio input device. The driving recorder according to Patent Literature 1 records video and audio for a predetermined period of time starting from a time point as far back as a storage period preceding a certain time point. Video and audio are recorded from the time point as far back as the preset period in this manner, whereby the driving recorder records an incident that triggered an accident and the accident that subsequently occurred.

SUMMARY

However, a duration of time from a time point at which an incident triggering an accident starts until the accident occurs lengthens in some cases, depending on a traveling state of a vehicle. Accordingly, if retroactive recording is started, going as far back as a predetermined period before a time point at which the accident occurred, the incident triggering the accident possibly had started before the preset time point at which the recording is started. Moreover, a duration of time from a time point at which an incident triggering a traffic accident or the like starts until the accident occurs lengthens in some cases, depending on an operating state of a vehicle. Accordingly, if retroactive recording is started, going as far back as a predetermined period before a time point at which the accident occurred, the incident triggering the accident possibly had started before the preset time point at which the recording is started.

A recording control device according to one of the present embodiments includes: a video data acquisition unit configured to acquire data on a video obtained by shooting an outside of a vehicle; a buffer memory configured to temporarily store the data on the video; an event detection unit configured to detect occurrence of a predetermined event; a traveling information acquisition unit configured to acquire traveling information on the vehicle; and a recording control unit configured to, based on the traveling information, determine a first period, which is a period preceding a time point of detection of the event, and to, based on the detection of the event by the event detection unit, record the data on the video, among the data on the video stored in the buffer memory, obtained from a time point as far back as the first period before the time point of detection of the event until a time point at which a second period has passed since the time point of detection of the event.

A recording control device according to another embodiment includes: a video data acquisition unit configured to acquire video data that is data on a video obtained by shooting an outside of a vehicle; a buffer memory configured to temporarily store the video data; an event detection unit configured to detect occurrence of a predetermined event; a vehicle information acquisition unit configured to acquire vehicle information including an operating state of a driver assistance function of the vehicle; and a recording control unit configured to control recording of the video data and to output the video data to a recording unit, wherein when the event detection unit detects the event, the recording control unit outputs the video data, among the video data stored in the buffer memory, obtained from a time point as far back as a first period before a time point of detection of the event until a time point at which a second period has passed since the time point of detection of the event, and if the recording control unit detects, from the vehicle information acquisition unit, that the driver assistance function of the vehicle is operating when the event detection unit detects the event, the recording control unit sets the first period longer than if the recording control unit does not detect that the driver assistance function is operating.

Moreover, a recording control method according to one of the present embodiments includes: acquiring video data that is data on a video obtained by shooting an outside of a vehicle; temporarily storing the video data; detecting occurrence of a predetermined event; acquiring traveling information on the vehicle; and based on the traveling information, determining a first period, which is a period preceding a time point of detection of the event, and based on the detection of the event, recording the video data, among the stored video data, obtained from a time point as far back as the first period before the time point of detection of the event until a time point at which a second period has passed since the time point of detection of the event.

Further, a recording control program according to one of the present embodiments causes a computer to perform: acquiring video data that is data on a video obtained by shooting an outside of a vehicle; temporarily storing the video data; detecting occurrence of a predetermined event; acquiring traveling information on the vehicle; and based on the traveling information, determining a first period, which is a period preceding a time point of detection of the event, and based on the detection of the event, recording the video data, among the stored video data, obtained from a time point as far back as the first period before the time point of detection of the event until a time point at which a second period has passed since the time point of detection of the event.

According to the present embodiments, it is possible to provide a recording control device, a recording apparatus, a recording control method, and a recording control program that appropriately record an incident triggering an accident.

BRIEF DESCRIPTION OF THE DRAWINGS

FIG. 3 shows an example of settings in a recording control unit 116 according to the first embodiment;

FIG. 5 shows an example of settings in the recording control unit 116 according to a second embodiment;

FIG. 7 shows an example of settings in the recording control unit 116 according to a third embodiment;

FIG. 9 shows an example of settings in the recording control unit 116 according to a fourth embodiment;

FIG. 12 shows an example of settings in the recording control unit 116 according to a fifth embodiment;

FIG. 15 shows an example of settings in a recording control unit 214 according to the sixth embodiment;

DETAILED DESCRIPTION

First Embodiment

Figure 1:
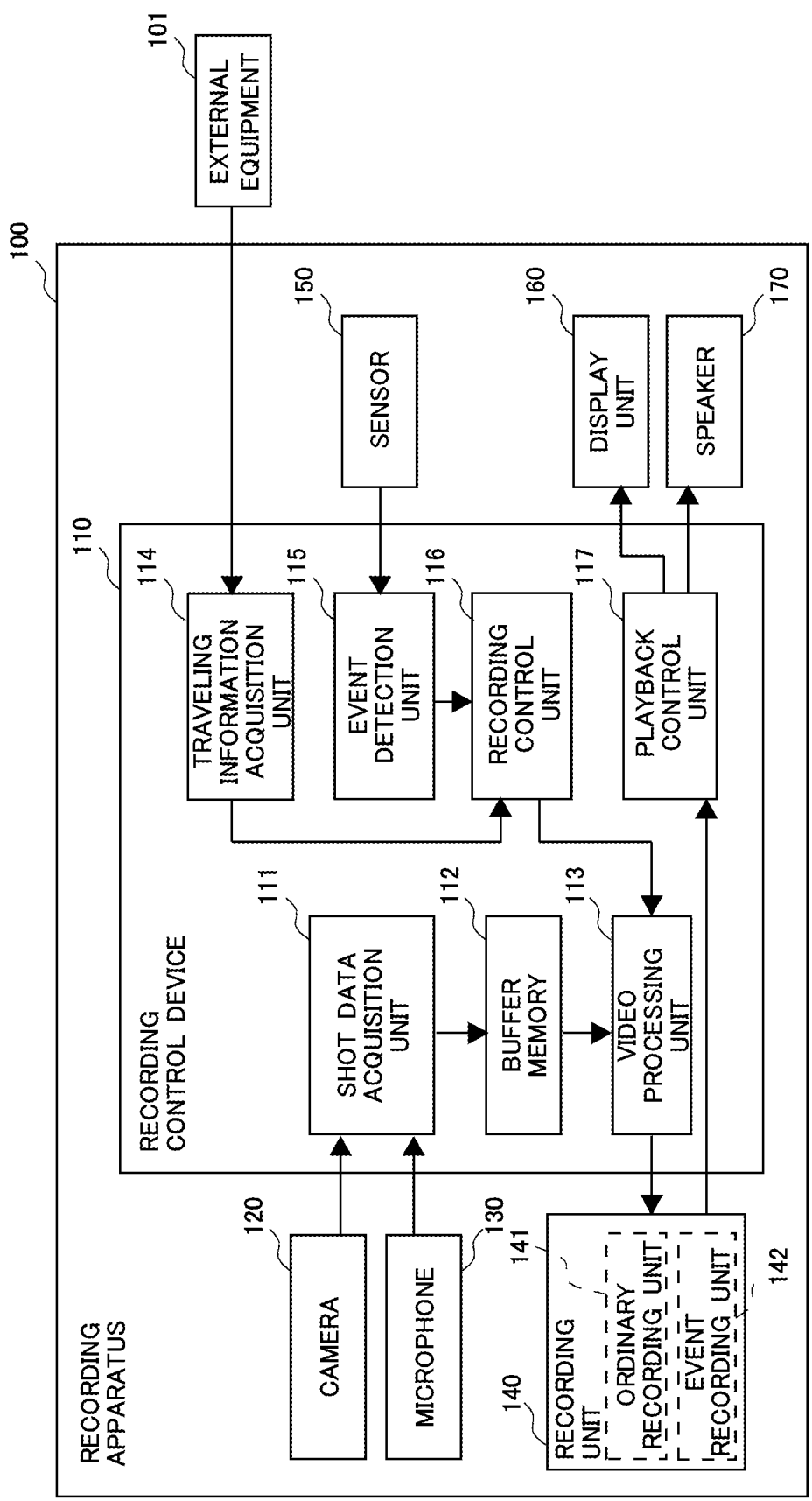
FIG. 1 is a functional block diagram of a recording apparatus 100 according to a first embodiment.

Hereinafter, embodiments of the present invention will be described with reference to drawings. An example of a configuration of a recording apparatus 100 according to a first embodiment will be described using FIG. 1. FIG. 1 is a functional block diagram of the recording apparatus 100 according to the first embodiment. For example, the recording apparatus 100 is used for a driving recorder mounted on a vehicle. The recording apparatus 100 can be implemented as an apparatus in various forms, such as a computer apparatus that operates by a processor executing a program stored in a memory. Examples include a recording apparatus 100 that can implement functions of the present invention, such as a driving recorder that is retrofittable to a vehicle or is portable, a recording apparatus 100 that can be implemented as a unit pre-mounted on a vehicle or as a function of another apparatus, and the like. The processor is, for example, a microprocessor, an MPU (Micro Processing Unit), or a CPU (Central Processing Unit). The memory is a volatile memory or a non-volatile memory, and may be configured by combining a volatile memory and a non-volatile memory. The processor executes one or more programs including instructions for causing a computer to perform processing, which will be described below using drawings.

The recording apparatus 100 includes a recording control device 110, a camera 120, a microphone 130, a recording unit 140, a sensor 150, a display unit 160, and a speaker 170. The recording control device 110 is connected to external equipment 101. The recording control device 110 and each of the camera 120, the microphone 130, the recording unit 140, the sensor 150, the display unit 160, the speaker 170, and the external equipment 101 may be directly connected to each other by using a predetermined cable or the like, or may be connected through a CAN (Controller Area Network), which is an in-vehicle network.

The external equipment 101 generates traveling information and outputs the traveling information to a traveling information acquisition unit 114 included in the recording control device 110. The external equipment 101 is, for example, a vehicle velocity sensor provided to the vehicle, a measured distance sensor that measures an inter-vehicle distance, a car navigation system, or the like, and part or all of these sensors, system, and the like may be collectively referred to as the external equipment 101. The traveling information includes, for example, vehicle velocity information. The traveling information may also include vehicle location information and the like. The traveling information may also include a traveling road type, which is the type of a road on which the vehicle travels. The traveling information may also include an inter-vehicle distance from another vehicle that is traveling in front of or in back of the vehicle.

The camera 120 generates video data obtained by shooting an outside of the vehicle. For example, the camera 120 may be a single camera that shoots only the front outside of the vehicle, or may be two cameras that shoot the front outside and the back outside of the vehicle, respectively. The camera 120 may be two cameras that shoot an outside and an inside of the vehicle, respectively. The cameras that shoot an outside and an inside of the vehicle, respectively, may be an omnidirectional camera that can shoot 360-degree surroundings.

The microphone 130 collects audio from the inside and the outside of the vehicle and generates audio data.

The recording unit 140 records a shot file including at least the video data. The shot file may also include the audio data. For example, the recording unit 140 is configured by using hardware such as a hard disk, a solid-state drive, or a card memory. The recording unit 140 includes an ordinary recording unit 141 and an event recording unit 142. The ordinary recording unit 141 and the event recording unit 142 may be configured as memory areas with different addresses within the recording unit 140, or may be configured as different pieces of hardware. Virtual addresses or flags based on information written in a header, a payload, or the like of shot data recorded in the recording unit 140 may be referred to as the ordinary recording unit 141 and the event recording unit 142, respectively. The recording unit 140 may be an external recording apparatus to which shot data is transmitted by a communication function (not shown).

The sensor 150 is, for example, an acceleration sensor that senses a change in velocity of the vehicle in frontward and backward directions, rightward and leftward directions, or upward and downward directions, that is, an acceleration. In other words, the sensor 150 senses that an impact is exerted on the vehicle. An impact is exerted on the vehicle, for example, when a driver makes a sudden braking operation or a sudden acceleration operation, when a driver makes a sudden steering operation, when the vehicle collides with another object, and the like. In place of an acceleration of the vehicle, sensor 150 may sense a traveling velocity of the vehicle.

The display unit 160 is a display that plays back the video data recorded in the recording unit 140. For example, the display unit 160 is a display apparatus such as a liquid crystal display (LCD) apparatus, an organic light-emitting diode (OLED) apparatus, or a head up display. The display unit 160 is disposed at a location the driver can visually see when the driver is operating the vehicle. The location the driver can visually see when the driver is operating the vehicle refers to, for example, a center console, a dashboard, a meter panel, a rearview mirror, a steering wheel, a front windshield, or the like of the vehicle.

The speaker 170 plays back the audio data recorded in the recording unit 140. The speaker 170 includes an audio amplification unit (not shown) and an audio processing unit (not shown), which are assumed to be included when the speaker 170 is mentioned.

Next, an example of a configuration of the recording control device 110 will be described. The recording control device 110 includes a shot data acquisition unit 111, a buffer memory 112, a video processing unit 113, the traveling information acquisition unit 114, an event detection unit 115, a recording control unit 116, and a playback control unit 117. Each constituent element included in the recording control device 110 is, for example, software stored in the memory. Each constituent element included in the recording control device 110 may be hardware such as a circuit or a chip. Each constituent element included in the recording control device 110 may be a combination of software and hardware.

The shot data acquisition unit 111 acquires video data generated by the camera 120 and audio data generated by the microphone 130. Data including the video data and the audio data may also be referred to as shot data. The shot data acquisition unit 111 can be said to include a video data acquisition unit and an audio data acquisition unit. That is, the shot data acquisition unit 111 acquires shot data from the camera 120 and the microphone 130. The video data is generated by using, for example, the H.264 or H.265 scheme or the like. The audio data may be generated by using, for example, the PCM (Pulse Code Modulation) scheme or the like. The shot data, which is moving image data including the video data and the audio data, may be generated by using MPEG (Moving Picture Experts Group) 2-TS (Transport Stream), AVI (Audio Video Interleave), or the like. The shot data acquisition unit 111 outputs the shot data including the video data and the audio data to the buffer memory 112.

The buffer memory 112 temporarily stores the shot data outputted by the shot data acquisition unit 111. The buffer memory 112 may also be referred to as an internal memory embedded in the recording control device 110. "Temporarily stores" refers to, for example, the buffer memory 112 deleting the shot data after a preset period of time has passed. Alternatively, "temporarily stores" may refer to the data in the buffer memory 112 being overwritten with data outputted from the shot data acquisition unit 111, which is then stored. Alternatively, "temporarily stores" may refer to, when the buffer memory 112 outputs the shot data outputted from the shot data acquisition unit 111 to the video processing unit 113, the buffer memory 112 deleting the outputted shot data. The buffer memory 112 outputs the temporarily stored shot data to the video processing unit 113.

The video processing unit 113, at an instruction from the recording control unit 116, generates a shot file by processing the shot data outputted by the buffer memory 112 and outputs the shot file to the recording unit 140. That is, for example, the video processing unit 113 may generate a shot file of a preset period of time by processing the shot data outputted by the buffer memory 112. The video processing unit 113 may generate a shot file of a preset angle of view by processing the shot data outputted by the buffer memory 112. The video processing unit 113 may generate shot data of a preset period of time or a preset angle of view by processing the shot data outputted by the buffer memory 112, and may generate a shot file by adding header information such as a file name, or the like to the generated shot data. The video processing unit 113 may perform denoising, distortion correction, and the like by processing the shot data outputted by the buffer memory 112. The video processing unit 113 may generate shot data on which time information, vehicle velocity information, vehicle location information, or the like is displayed.

The traveling information acquisition unit 114 acquires traveling information outputted from the external equipment 101 and the like and outputs the traveling information to the recording control unit 116. The traveling information acquisition unit 114 acquires traveling information in every preset period. The traveling information acquired by the traveling information acquisition unit 114 is acquired not only from the external equipment 101, but may be acquired from a sensor and the like included in the recording apparatus 100.

The event detection unit 115 receives information outputted by the sensor 150 and detects occurrence of a preset event. Note that in the present description, the preset event refers to, for example, sudden braking, dangerous driving, a traffic accident, or the like. For example, if an impact level detected by the sensor 150 operating as an acceleration sensor exceeds a preset value, the event detection unit 115 detects that an event such as sudden braking, dangerous driving, or a traffic accident has occurred. "An impact level exceeds a preset value" may be rephrased as "an acceleration exceeds a preset value". When the event detection unit 115 detects occurrence of an event, the event detection unit 115 outputs information indicating occurrence of the event to the recording control unit 116. The information indicating occurrence of the event may include a time of day at which the event occurred. The information indicating occurrence of the event may also include values of acceleration and the like from a time point as far back as a preset period before the time of day at which the event occurred until the time of day at which the event occurred.

The recording control unit 116 sends an instruction to the video processing unit 113 and causes the video processing unit 113 to generate a shot file that is not derived from an event detected by the event detection unit 115 (hereinafter, referred to as an ordinary shot file). The recording control unit 116 then sends an instruction to the video processing unit 113 and causes the video processing unit 113 to output the generated ordinary shot file to the recording unit 140. When the recording control unit 116 receives the traveling information outputted by the traveling information acquisition unit 114 and the information outputted by the event detection unit 115, the recording control unit 116 sends an instruction to the video processing unit 113 and causes the video processing unit 113 to generate a shot file derived from an event (hereinafter, referred to as an event shot file). The recording control unit 116 then sends an instruction to the video processing unit 113 and causes the video processing unit 113 to output the generated event shot file to the recording unit 140. The recording control unit 116 may output to the video processing unit 113, for example, a file name, file type information, and the like as header information to generate a shot file. The recording control unit 116 may determine starting time and ending time of a shot file and may output the starting time and the ending time to the video processing unit 113.

The recording control unit 116 makes the event shot file and the ordinary shot file to be recorded in the recording unit 140 distinctively from each other. "Makes the event shot file and the ordinary shot file to be recorded in the recording unit 140 distinctively from each other" may refer to the recording control unit 116 setting flag information or the like indicative of an event shot file in the header or the payload of the event shot file. The recording control unit 116 may also set flag information or the like indicative of an ordinary shot file in the header or the payload of the ordinary shot file, or does not need to set flag information. That is, shot data on which no flag information is set may be recognized as an ordinary shot file. Conversely, if flag information indicative of an ordinary shot file is set in the header or the payload of the ordinary shot file, flag information does not need to be set on the event shot file. The recording control unit 116 may make the ordinary shot file to be recorded in the ordinary recording unit 141 and may make the event shot file to be recorded in the event recording unit 142.

The recording control unit 116 may make the event shot file to be recorded in the recording unit 140 as overwriting-disallowed data. For example, the recording control unit 116 may make the event shot file to be recorded in the recording unit 140, with a designation of an address of a memory area where overwriting of data is disallowed within the recording unit 140. Alternatively, the recording control unit 116 may set flag information or the like indicating that overwriting is disallowed in the header or the payload of the event shot file. The address of the memory area where overwriting of data is disallowed within the recording unit 140 may coincide with an address of a memory area where the event shot file is recorded within the recording unit 140, or any one of the memory areas may be included in the other memory area.

The recording control unit 116 may make the ordinary shot file to be recorded in the recording unit 140 as overwriting-allowed data. For example, the recording control unit 116 may make the ordinary shot file to be recorded in the recording unit 140, with a designation of an address of a memory area where overwriting of data is allowed within the recording unit 140. Alternatively, the recording control unit 116 may set flag information or the like indicating that overwriting is allowed in the header or the payload of the ordinary shot file. The address of the memory area where overwriting of data is allowed within the recording unit 140 may coincide with an address of a memory area where the ordinary shot file is recorded within the recording unit 140, or any one of the memory areas may be included in the other memory area.

The playback control unit 117 acquires shot data recorded in the recording unit 140, outputs video data based on the acquired shot data to the display unit 160, and outputs audio data based on the acquired shot data to the speaker 170 or the like. When the playback control unit 117 receives information instructing to play back a shot file entered by a user operating the recording apparatus 100, the playback control unit 117 acquires the shot file the user desires to play back from the memory area within the recording unit 140.

Figure 2:
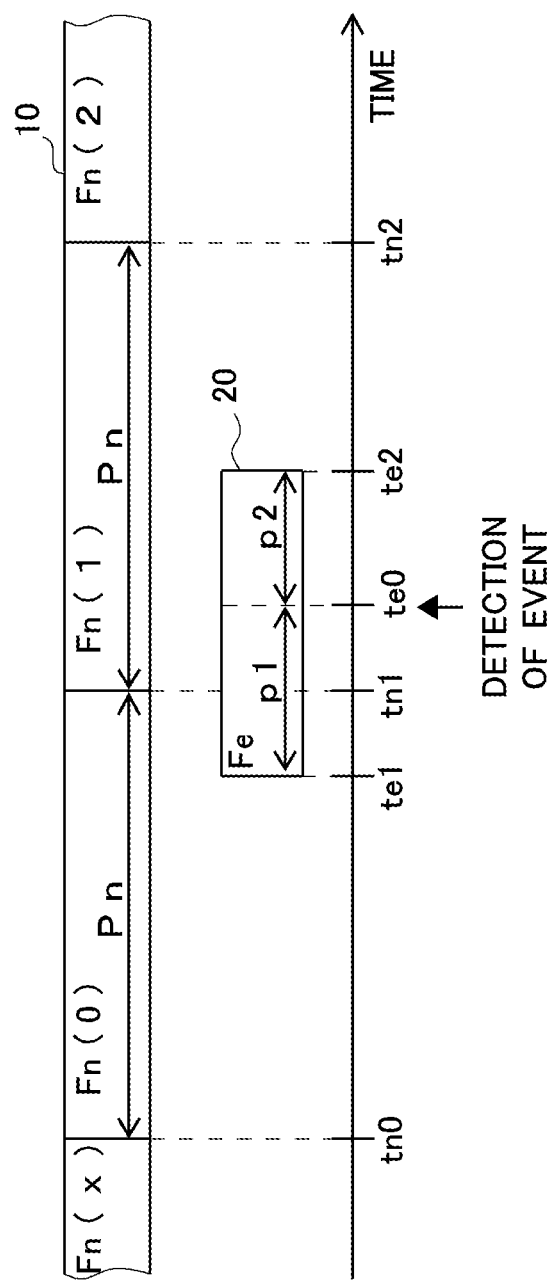
FIG. 2 shows a relationship between a file outputted by a recording control device 110 and time.

Next, a relationship between a shot file and time will be described with reference to FIG. 2. FIG. 2 shows a relationship between a file outputted by the recording control device 110 and time. The horizontal axis of FIG. 2 shows that time passes from time tn0 toward time tn2. A strip-shaped file group 10 shown in parallel with the time axis represents ordinary shot files outputted by the recording control device 110. The video processing unit 113 sequentially generates an ordinary shot file in every preset period Pn. The preset period Pn may be, for example, several tens of seconds or may be several minutes. For example, shot data obtained from the time tn0 until time tn1 makes an ordinary shot file Fn(0). That is, the video processing unit 113 generates shot data obtained from the time tn0 until the time tn1 as an ordinary shot file Fn(0) and outputs the ordinary shot file Fn(0) to the ordinary recording unit 141 included in the recording unit 140. Subsequently, the video processing unit 113 generates shot data obtained from the time tn1 until the time tn2 as an ordinary shot file Fn(1) and outputs the ordinary shot file Fn(1) to the ordinary recording unit 141. Similarly, the video processing unit 113 generates an ordinary shot file Fn(2) starting from the time tn2 and outputs the ordinary shot file Fn(2) to the ordinary recording unit 141.

When the video processing unit 113 generates an ordinary shot file, the buffer memory 112 stores shot data having a longer period than the period of shot data processed as the ordinary shot file. In the example of FIG. 2, shot data stored by the buffer memory 112 has a longer period than period Pn. The video processing unit 113 processes shot data as long as the period Pn, of the shot data stored in the buffer memory 112, and generates an ordinary shot file. That is, the video processing unit 113 generates an ordinary shot file after shot data as long as the period Pn is stored in the buffer memory 112.

The recording unit 140 may preset the number of shot files to be recorded. In this case, after the recording unit 140 records the preset number of shot files, the recording unit 140 may record a new shot file after deleting an oldest shot file. The recording unit 140 may write a new shot file over an area where an oldest shot file is recorded.

Next, the event shot file will be described. A file 20 shown in a rectangular shape is an event shot file Fe. The event shot file Fe is a shot file including shot data obtained from time te1 until time te2.

Here, a principle of how the event shot file Fe is generated will be described. First, when an event occurs such as a strong impact being exerted on the vehicle, the event detection unit 115 detects the event at time te0, which is immediately after occurrence of the event. The event detection unit 115 outputs information indicating occurrence of the event to the recording control unit 116. The recording control unit 116, upon receiving the information outputted by the event detection unit 115, instructs the video processing unit 113 to process shot data obtained from the time te1 as far back as a first period p1 before the time te0 at which the event was detected, until the time te2 at which a second period p2 has passed since the time te0 at which the event was detected, in the form of a file. The video processing unit 113, upon receiving the instruction from the recording control unit 116, generates shot data obtained from the time te1 until the time te2 outputted from the buffer memory 112 as an event shot file Fe. Further, the video processing unit 113, upon receiving an instruction from the recording control unit 116, outputs the event shot file Fe to the recording unit 140. Note that the event shot file Fe may include information indicating that overwriting is disallowed in the header or the payload. An area where the event shot file Fe is recorded may be a designated area where overwriting is disallowed.

The event shot file Fe thus recorded includes the shot data obtained from the time te1 as far back as the first period p1 before the time te0 at which the event was detected until a time point of occurrence of the event. The reason why video data is recorded from a time point as far back as the preset period before a time point of occurrence of an event as described above is to identify a cause of occurrence of the event such as an accident.

The recording control unit 116 can determine the first period p1, based on the traveling information outputted by the traveling information acquisition unit 114. The recording control unit 116 acquires velocity information immediately before the time te0 at which the event was detected. "Immediately before" here refers to a timing that allows a traveling velocity of the vehicle at the time of occurrence of the event to be determined, and the velocity information is, for example, velocity information included in the traveling information acquired at a time point as far back as a preset period before the time te0 at which the event was detected. Examples of the preset period include one second, five seconds, 10 seconds, and the like. The traveling velocity is not limited to a traveling velocity at the time point as far back as such the preset period, but may be an average velocity for a period of time having a preset range preceding the time te0 at which the event was detected. For example, the traveling velocity is an average velocity for a period of time from 10 seconds to one second before the time te0 at which the event was detected. The recording control unit 116 can make the first period p1 longer as the acquired velocity of the vehicle is higher. The recording control unit 116 sets the longer first period p1 when the acquired velocity of the vehicle is equal to or higher than a preset velocity, than when the acquired velocity of the vehicle is lower than the preset velocity.

The first period p1 is set in this manner, whereby, for example, it is possible to individually set a time point to start recording for an event shot file when the vehicle is traveling at a relatively low velocity on a general road, and a time point to start recording for an event shot file when the vehicle is traveling at a relatively high velocity on an expressway or the like.

Note that the video processing unit 113 may parallelly perform processing of generating an ordinary shot file and processing of generating an event shot file. The video processing unit 113 may sequentially perform processing of generating an ordinary shot file and processing of generating an event shot file.

FIG. 3 is a table showing an example of settings in the recording control unit 116 according to the first embodiment. The recording control unit 116 acquires a traveling velocity v of the vehicle at a time point as far back as the preset period before the time te0 at which an event was detected. If the traveling velocity v is less than V1 (for example, less than 60 kilometers per hour), the first period p1 is set to Ps (for example, 10 seconds). On the other hand, if the traveling velocity v is equal to or more than V1 (for example, equal to or more than 60 kilometers per hour), the first period p1 is set to Pf (for example, 20 seconds) that is longer than Ps. Note that the second period p2 is set to Pe (for example, 10 seconds) in any case. Note that the specific velocities and periods recited here are only examples as a matter of course. Accordingly, the second period p2 may be changed with values of the traveling velocity v.

Figure 4:
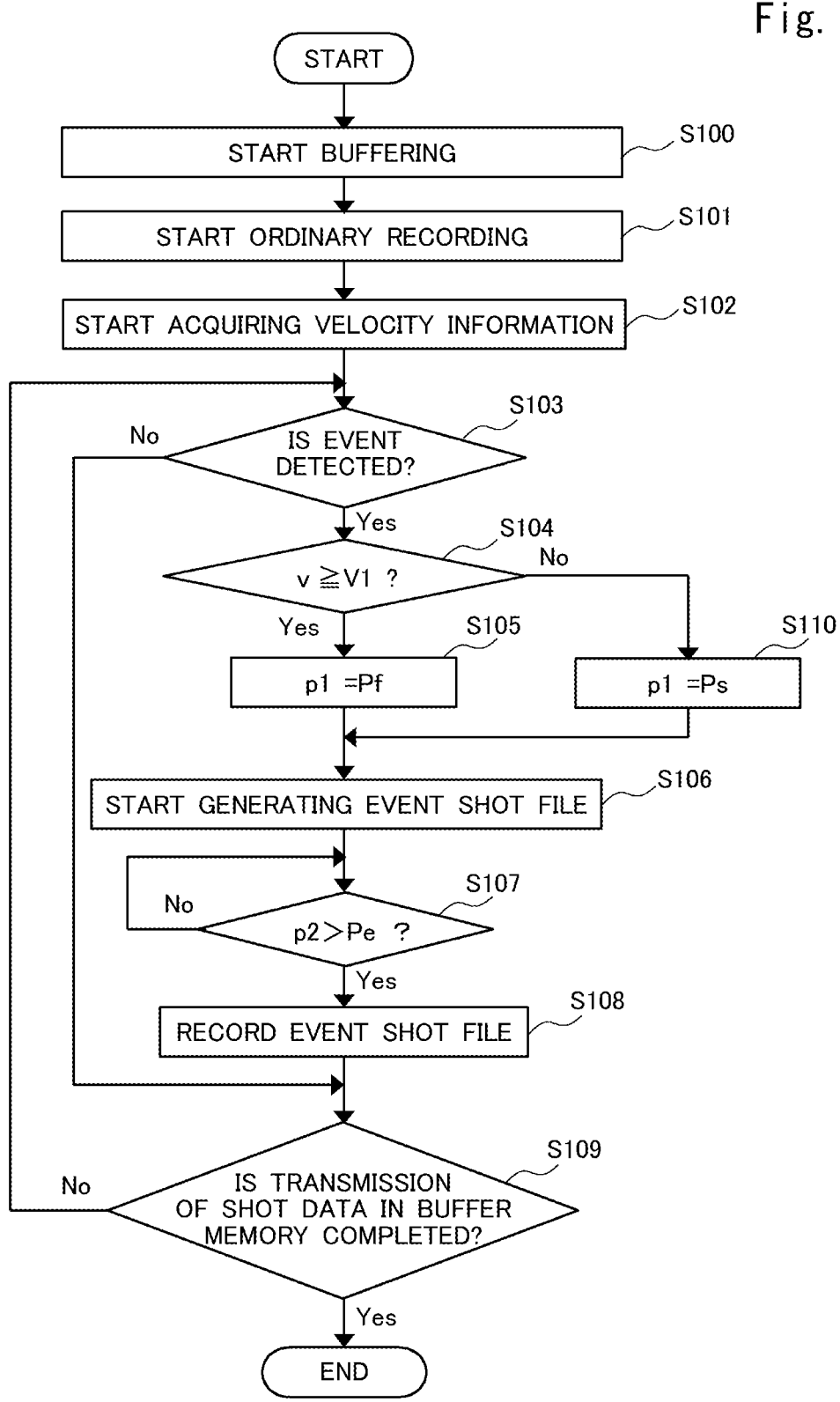
FIG. 4 is a flowchart in the recording control device 110 according to the first embodiment.

Next, processing in the recording control device 110 will be described with reference to FIG. 4. FIG. 4 is a flowchart showing the processing in the recording control device 110 according to the first embodiment.

First, when the recording apparatus 100 is activated, the shot data acquisition unit 111 outputs shot data including at least video data to the buffer memory 112. The buffer memory 112 starts storing, that is, buffering, the shot data (step S100).

Subsequently, the recording control unit 116 starts processing of causing the video processing unit 113 to generate an ordinary shot file and to output the ordinary shot file to the recording unit 140, as described with reference to FIG. 2 (step S101). Note that the processing in which the video processing unit 113 generates an ordinary shot file and outputs the ordinary shot file to the recording unit 140 will be referred to as ordinary recording hereinafter. The video processing unit 113 continuously performs the ordinary recording until the system is terminated. The recording unit 140 sequentially records the ordinary shot files outputted by the video processing unit 113. In addition to performing the above-described processing, the video processing unit 113 may also parallelly perform processing of generating an event shot file and outputting the event shot file to the recording unit 140, which will be described below.

Subsequently, the recording control unit 116 acquires traveling information outputted from the traveling information acquisition unit 114 in every preset period (for example, 100 milliseconds) (step S102). Note that the recording control unit 116 may store the traveling information acquired in every preset period in the memory.

Subsequently, the recording control unit 116 monitors information outputted from the event detection unit 115 in every preset period (for example, 100 milliseconds) and determines whether or not an event is detected (step S103). If the recording control unit 116 does not determine that an event is detected (step S103: No), the recording control unit 116 determines whether or not all shot data stored in the buffer memory 112 is transmitted to the video processing unit 113 (step S109). If the recording control unit 116 determines that an event is detected (step S103: Yes), the recording control unit 116 moves on to processing of determining the first period p1 to generate an event shot file.

The recording control unit 116 monitors information from the traveling information acquisition unit 114 and acquires a traveling velocity v at a time of day as far back as the preset period before a time of day at which an event was detected. The recording control unit 116 then determines whether or not the traveling velocity v is equal to or more than V1 (step S104).

When the recording control unit 116 determines that the traveling velocity v is equal to or more than V1 (step S104: Yes), the recording control unit 116 sets the first period p1 to Pf (step S105). On the other hand, when the recording control unit 116 does not determine that the traveling velocity v is equal to or more than V1 (step S104: No), the recording control unit 116 sets the first period p1 to Ps, as a setting in the case where the traveling velocity v is less than V1 (step S110).

Upon determining the first period p1, the recording control unit 116 sends an instruction to the video processing unit 113 and causes the video processing unit 113 to start generating an event shot file (step S106). The recording control unit 116 monitors times of day and determines whether or not the second period p2 exceeds Pe, which is the preset period (step S107). If the recording control unit 116 does not determine that the second period p2 exceeds Pe (step S107: No), the recording control unit 116 causes the video processing unit 113 to continue generating the event shot file. On the other hand, if the recording control unit 116 determines that the second period p2 exceeds Pe (step S107:

Yes), the recording control unit 116 causes the video processing unit 113 to stop generating the event shot file and to output the event shot file generated by the video processing unit 113 to the recording unit 140 (step S108).

When recording of the event shot file is completed, the recording control unit 116 determines whether or not all shot data in the buffer memory 112 is transmitted to the video processing unit 113 (step S109). If the recording control unit 116 determines that all shot data in the buffer memory 112 is transmitted to the video processing unit 113 (step S109: Yes), the recording control unit 116 terminates the processing. "All shot data in the buffer memory 112 is transmitted to the video processing unit 113" refers to, for example, a case where the driver performs an operation to stop shooting, or a case where an engine is stopped, so that shooting by the camera 120 is stopped, or the like.

On the other hand, if the recording control unit 116 does not determine that all shot data in the buffer memory 112 is transmitted to the video processing unit 113 (step S109: No), the recording control unit 116 repeats the processing of monitoring information outputted from the event detection unit 115 and determining whether or not an event is detected (step S103), in addition to making an ordinary shot file to be continuously recorded.

With a configuration as described above, it is possible to provide the recording control device, the recording apparatus, the recording control method, and the recording control program that can appropriately record an incident triggering an accident.

Second Embodiment

Next, a second embodiment will be described. The second embodiment is different from the first embodiment in the settings of the traveling velocity v and the first period p1 in the recording control unit 116. Note that a description of matters overlapping with the already described matters will be omitted as appropriate.

FIG. 5 is a table showing an example of settings in the recording control unit 116 according to the second embodiment. The recording control unit 116 acquires a traveling velocity v of the vehicle at a time point as far back as a preset period before the time te0 at which an event was detected. If the traveling velocity v is less than V1 (for example, less than 60 kilometers per hour), the first period p1 is set to Ps (for example, 10 seconds). If the traveling velocity v is equal to or more than V1 (for example, equal to or more than 60 kilometers per hour) and less than V2 (for example, less than 80 kilometers per hour), the first period p1 is set to Pm (for example, 20 seconds) that is longer than Ps. If the traveling velocity v is equal to or more than V2 (for example, equal to or more than 80 kilometers per hour), the first period p1 is set to Pf (for example, 30 seconds) that is longer than Pm. Note that the second period p2 is set to Pe (for example, 10 seconds) in any case. Note that the specific velocities and periods recited here are only examples as a matter of course. Accordingly, the second period p2 may be changed with values of the traveling velocity v.

Figure 6:
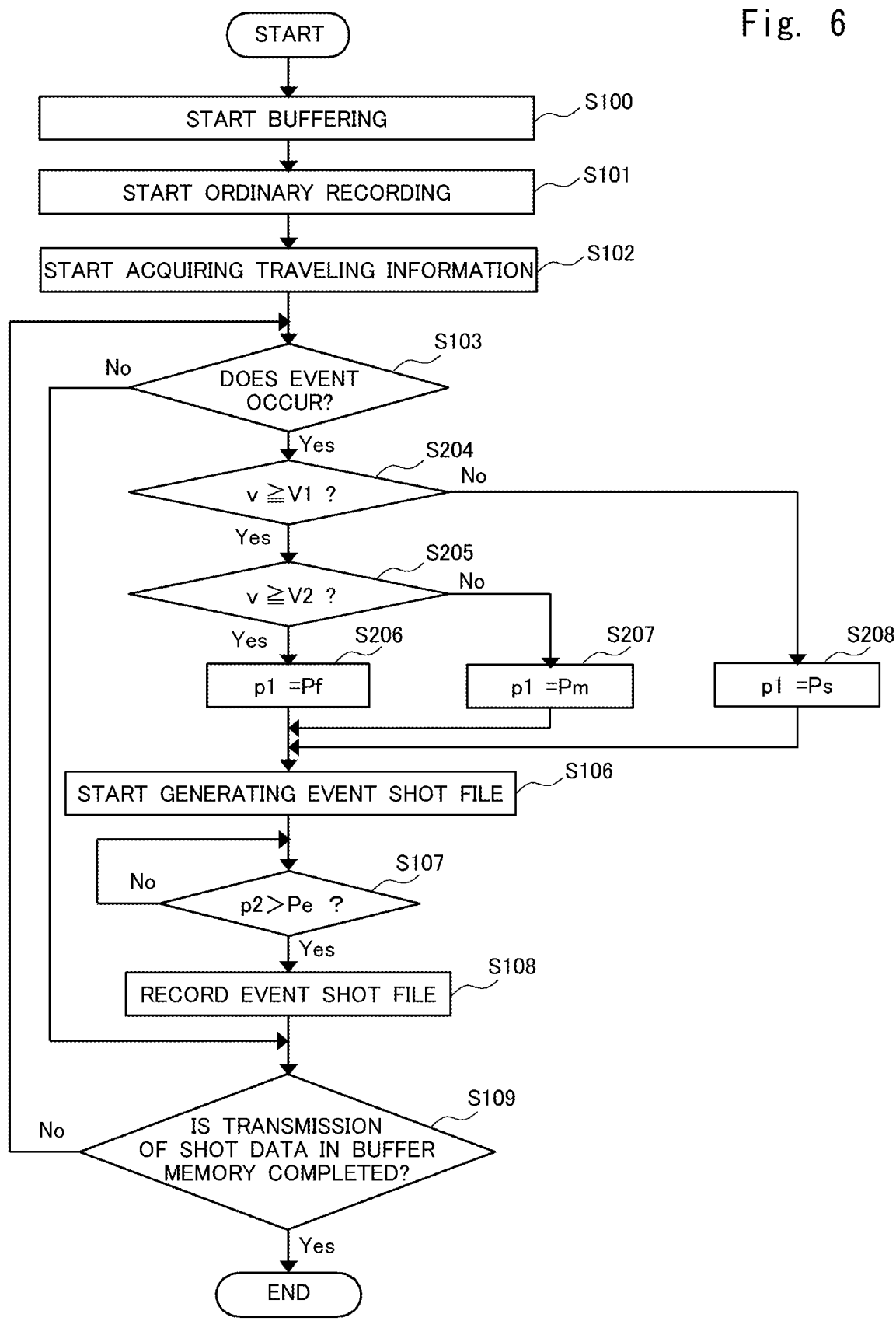
FIG. 6 is a flowchart in the recording control device 110 according to the second embodiment.

Next, processing in the recording control device 110 according to the second embodiment will be described with reference to FIG. 6. FIG. 6 is a flowchart in the recording control device 110 according to the second embodiment. In the flowchart shown in FIG. 6, processing from step S100 to step S103 and from step S106 to step S109 is similar to the processing in the flowchart according to the first embodiment shown in FIG. 4. Therefore, a description of the processing overlapping with the processing in the first embodiment will be omitted here as appropriate.

First, when the recording apparatus is activated, the buffer memory 112 starts storing, that is, buffering, shot data (step S100). Thereafter, processing up to step S103 is similar to the processing in the first embodiment.

In step S103, if the recording control unit 116 determines that an event is detected (step S103: Yes), the recording control unit 116 determines whether or not the traveling velocity v is equal to or more than V1 (step S204).

If the recording control unit 116 does not determine that the traveling velocity v is equal to or more than V1 (step S204: No), the recording control unit 116 sets the first period p1 to Ps, as a setting in the case where the traveling velocity v is less than V1, based on the settings in the table shown in FIG. 5 (step S208). On the other hand, if the recording control unit 116 determines that the traveling velocity v is equal to or more than V1 (step S204: Yes), the recording control unit 116 further determines whether or not the traveling velocity v is equal to or more than V2 (step S205).

If the recording control unit 116 does not determine that the traveling velocity v is equal to or more than V2 (step S205: No), the recording control unit 116 sets the first period p1 to Pm, as a setting in the case where the traveling velocity v is equal to or more than V1 and less than V2 (step S207). On the other hand, if the recording control unit 116 determines that the traveling velocity v is equal to or more than V2 (step S205: Yes), the recording control unit 116 sets the first period p1 to Pf (step S206).

When the processing of setting the first period p1 is thus completed, subsequently, the recording control unit 116 starts generating an event shot file (step S106). Processing thereafter is similar to the processing in the first embodiment.

As described above, two or more values may be set for the first period p1 in the recording control unit 116. That is, the recording control unit 116 can make the first period p1 longer as the acquired velocity of the vehicle is higher.

Third Embodiment

Next, a third embodiment will be described. The third embodiment is different from the first embodiment in that the traveling information includes information about a traveling road on which the vehicle travels. Note that a description of matters overlapping with the already described matters will be omitted as appropriate.

FIG. 7 is a table showing an example of settings in the recording control unit 116 according to the third embodiment. The recording control unit 116 acquires a traveling road type r of the vehicle at a time point as far back as a preset period before the time te0 at which an event was detected. In the example shown in FIG. 7, roads on which the vehicle travels are categorized by the traveling road type r into three types, namely, general road (r=0), arterial highway (r=1), and expressway (r=2). The traveling road type r is information for identifying an allowable traveling velocity of the vehicle. General roads include, for example, roads on which vehicles travel at relatively low velocities, such as urban area streets, farm roads, and forest roads. Arterial highways include, for example, roads on which vehicles travel at velocities that are higher than on general roads and lower than on expressways, such as automobile roads that are not expressways, and national highways. Expressways include, for example, nationally designated expressways. The traveling road type r is not limited to the categories mentioned here, and may be categorized based on information on road width, legal speed, traffic, or the like.

In FIG. 7, if the traveling road type r is 0, the first period p1 is set to Ps (for example, 10 seconds). If the traveling road type r is 1, the first period p1 is set to Pm (for example, 20 seconds) that is longer than Ps. If the traveling road type r is 2, the first period p1 is set to Pf (for example, 30 seconds) that is longer than Pm. Note that the second period p2 is set to Pe (for example, 10 seconds) in any case. Note that the specific road types and periods recited here are only examples as a matter of course. Accordingly, the second period p2 may be changed with values of the traveling road type r.

Figure 8:
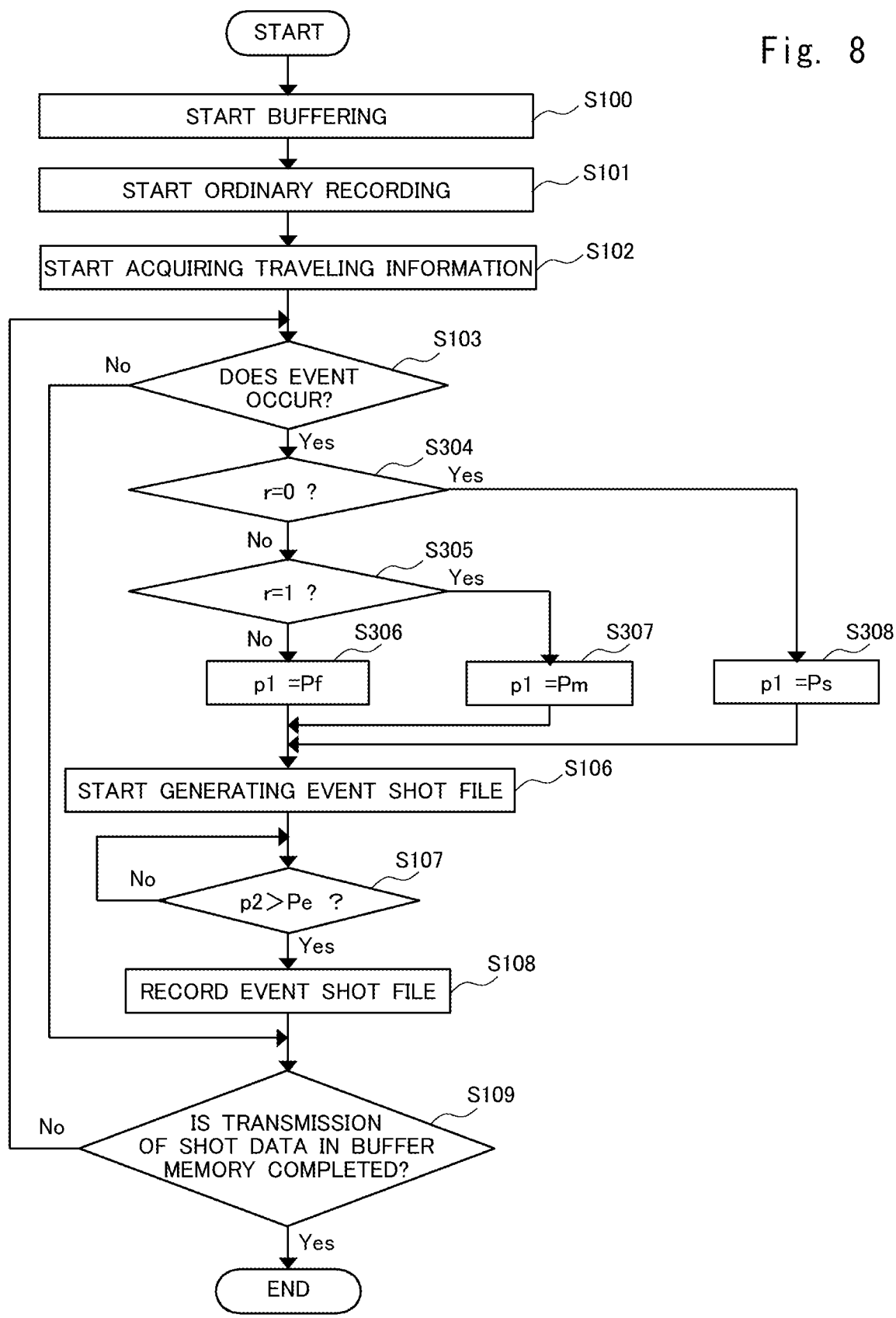
FIG. 8 is a flowchart in the recording control device 110 according to the third embodiment.

Next, processing in the recording control device 110 according to the third embodiment will be described with reference to FIG. 8. FIG. 8 is a flowchart in the recording control device 110 according to the third embodiment. In the flowchart shown in FIG. 8, processing from step S100 to step S103 and from step S106 to step S109 is similar to the processing in the flowchart according to the first embodiment shown in FIG. 4. Therefore, a description of the processing overlapping with the processing in the first embodiment will be omitted here as appropriate.

First, when the recording apparatus is activated, the buffer memory 112 starts storing, that is, buffering, shot data (step S100). Thereafter, processing up to step S103 is similar to the processing in the first embodiment.

In step S103, if the recording control unit 116 determines that an event is detected (step S103: Yes), the recording control unit 116 determines whether or not the traveling road type r of a road on which the vehicle is traveling is 0 (step S304).

If the recording control unit 116 determines that the traveling road type r is 0 (step S304: Yes), the recording control unit 116 sets the first period p1 to Ps, based on the settings in the table shown in FIG. 7 (step S308). On the other hand, if the recording control unit 116 does not determine that the traveling road type r is 0 (step S304: No), the recording control unit 116 further determines whether or not the traveling road type r is 1 (step S305).

If the recording control unit 116 determines that the traveling road type r is 1 (step S305: Yes), the recording control unit 116 sets the first period p1 to Pm (step S307). On the other hand, if the recording control unit 116 does not determine that the traveling road type r is 1 (step S305: No), the recording control unit 116 sets the first period p1 to Pf, as a setting in the case where the traveling road type r is 2 (step S306).

When the processing of setting the first period p1 is thus completed, subsequently, the recording control unit 116 starts generating an event shot file (step S106). Processing thereafter is similar to the processing in the first embodiment.

As described above, the recording control unit 116 can make the first period p1 longer based on the acquired type of a traveling road.

In the above-described first to third embodiments, the first period p1 is made longer depending on the traveling velocity of the vehicle, or the types of roads with different ranges of traveling velocity. For example, when the vehicle is traveling at a relatively high velocity or when the vehicle is traveling on an expressway, a sign triggering occurrence of an event, such as a competitive attitude toward another vehicle, tailgating, or being tailgated, may arise before a conventional retroactive recording period. By inclusively recording such a sign of occurrence of an event, a situation such as a cause of an accident can be grasped.

Fourth Embodiment

Next, a fourth embodiment will be described. The fourth embodiment is different from the first embodiment in that the traveling information includes information about an inter-vehicle distance from another vehicle that is traveling in front of or in back of the vehicle. Note that a description of matters overlapping with the already described matters will be omitted as appropriate.

FIG. 9 is a table showing an example of settings in the recording control unit 116 according to the fourth embodiment. The recording control unit 116 acquires an inter-vehicle distance d from a vehicle that is traveling in front of or in back of the vehicle at a time point as far back as a preset period before the time te0 at which an event was detected. The time point as far back as the preset period before the time te0 is, as an example, 10 seconds before the time te0, 20 seconds before the time te0, or the like. This period preferably includes a time point before the first period p1. This period may be determined based on, as an example, an average value of the inter-vehicle distance d between 30 seconds before the time te0 and 20 seconds before the time te0. In FIG. 9, if the inter-vehicle distance d is equal to or more than D1 (for example, equal to or more than 15 meters), the first period p1 is set to Ps (for example, 10 seconds). If the inter-vehicle distance d is less than D1 (for example, equal to or less than 15 meters) and is equal to or more than D2 (for example, equal to or more than seven meters), the first period p1 is set to Pm (for example, 20 seconds) that is longer than Ps. If the inter-vehicle distance d is less than D2 (for example, less than seven meters), the first period p1 is set to Pf (for example, 30 seconds). Note that the specific numerical values recited here are only examples as a matter of course. Accordingly, the second period p2 may be changed with values of the inter-vehicle distance d.

Figure 10:
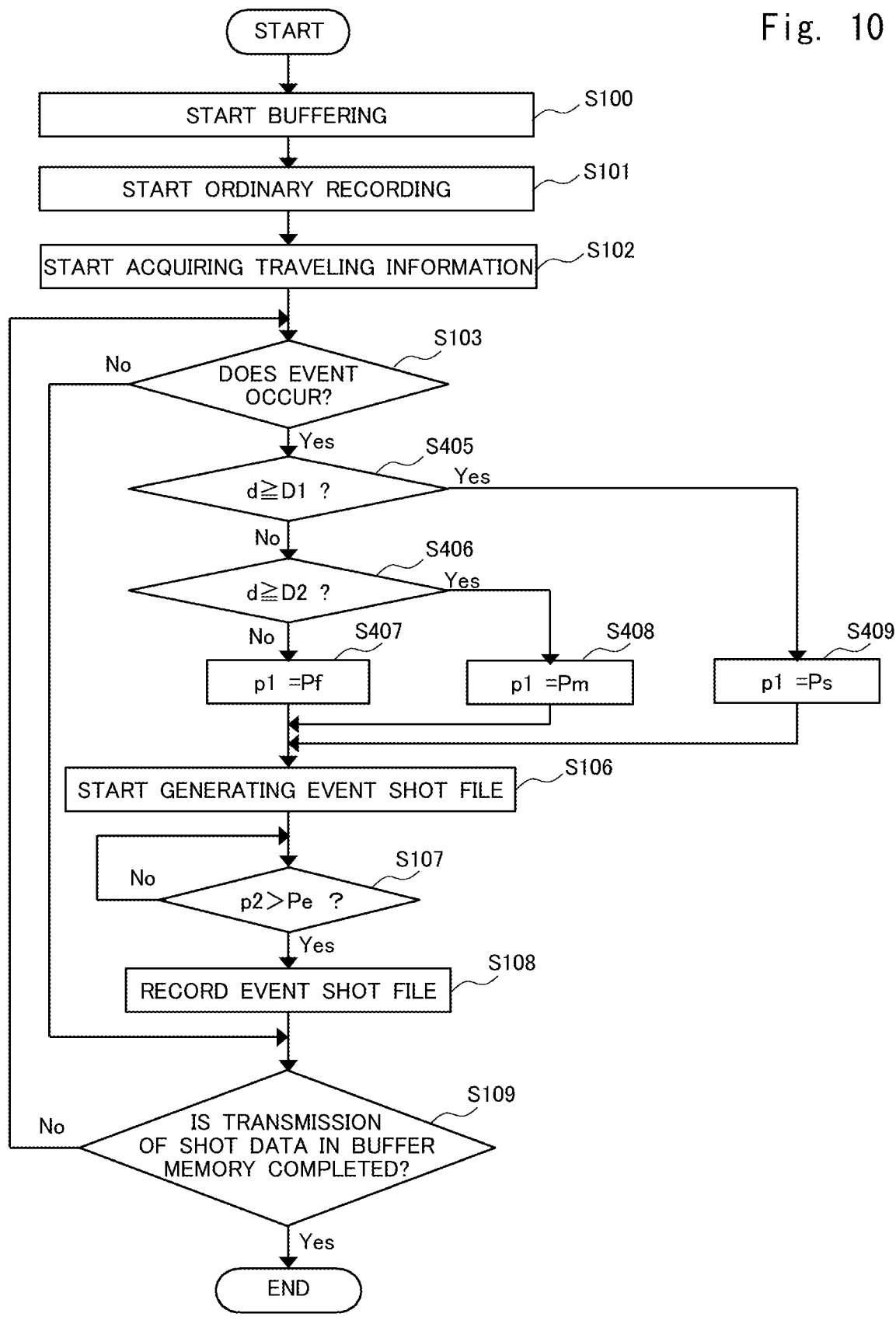
FIG. 10 is a flowchart in the recording control device 110 according to the fourth embodiment.

Next, processing in the recording control device 110 according to the fourth embodiment will be described with reference to FIG. 10. FIG. 10 is a flowchart in the recording control device 110 according to the fourth embodiment. In the flowchart shown in FIG. 10, processing from step S100 to step S103 and from step S106 to step S109 is similar to the processing in the flowchart according to the first embodiment shown in FIG. 4. Therefore, a description of the processing overlapping with the processing in the first embodiment will be omitted here as appropriate.

First, when the recording apparatus is activated, the buffer memory 112 starts storing, that is, buffering, shot data (step S100). Thereafter, processing up to step S103 is similar to the processing in the first embodiment.

In step S103, if the recording control unit 116 determines that an event is detected (step S103: Yes), the recording control unit 116 determines whether or not an inter-vehicle distance d at a time point as far back as the preset period from a time point at which the event was detected is equal to or more than D1 (step S405).

If the recording control unit 116 determines that the inter-vehicle distance d is equal to or more than D1 (step S405: Yes), the first period p1 is set to Ps (step S409). On the other hand, if the recording control unit 116 does not determine that the inter-vehicle distance d is equal to or more than D1 (step S405: No), the recording control unit 116 further determines whether or not the inter-vehicle distance d is equal to or more than D2 (step S406).

If the recording control unit 116 determines that the inter-vehicle distance d is equal to or more than D2 (step S406: Yes), the recording control unit 116 sets the first period p1 to Pm (step S408). On the other hand, if the recording control unit 116 does not determine that the inter-vehicle distance d is equal to or more than D2 (step S406: No), the recording control unit 116 sets the first period p1 to Pf, as a setting in the case where the inter-vehicle distance d is less than D2 (step S407).

When the processing of setting the first period p1 is thus completed, subsequently, the recording control unit 116 starts generating an event shot file (step S106). Processing thereafter is similar to the processing in the first embodiment.

Note that the recording control unit 116 may determine the first period p1 by monitoring all information on a plurality of inter-vehicle distances outputted during a preset period, of the information on inter-vehicle distances outputted by the traveling information acquisition unit 114.

Figure 11:
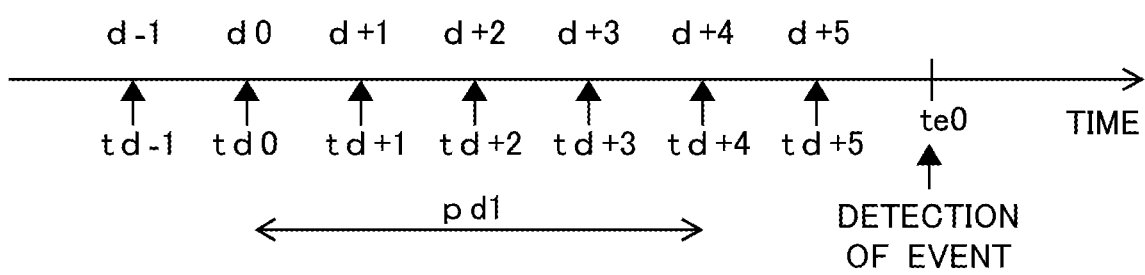
FIG. 11 is a diagram for explaining an example of traveling information acquired by the recording control unit 116.

FIG. 11 is a diagram for explaining an example of the traveling information acquired by the recording control unit 116. In FIG. 11, the horizontal axis represents time. Part of times of day at which the recording control unit 116 receives the traveling information from the traveling information acquisition unit 114 is illustrated as (td−1) to (td+5). At the time (td−1), the recording control unit 116 acquires an inter-vehicle distance (d−1) from the traveling information acquisition unit 114, as inter-vehicle distance information. Similarly, at time td0, the recording control unit 116 acquires an inter-vehicle distance d0 from the traveling information acquisition unit 114. Similarly thereafter, the recording control unit 116 acquires inter-vehicle distance information at each time of day. The recording control unit 116 sequentially and temporarily stores the inter-vehicle information obtained for a preset period.

When determining the first period p1, the recording control unit 116 refers to the inter-vehicle distance information obtained over a period pd1 from the time td0, which is a time point as far back as a preset period before the time te0 at which an event was detected, until time td+4, that is, refers to the inter-vehicle distance d0 to an inter-vehicle distance d4. The recording control unit 116 then determines whether or not each inter-vehicle distance information obtained over the period pd1 from the time td0 until the time td+4 falls within any of the preset distances. That is, for example, the inter-vehicle distances d shown in FIG. 9 include all of the inter-vehicle distances d0 to d+4. That is, the recording control unit 116 acquires the inter-vehicle distance d0 at the time td0 as far back as the preset period before the time te0 at which an event was detected. If all of the inter-vehicle distances d0 to d+4 acquired for the period pd1 is less than a preset distance, the recording control unit 116 sets the first period p1 longer than in a case where the inter-vehicle distance is equal to or more than the preset distance.

As described above, the recording control unit 116 can make the first period p1 longer based on the acquired inter-vehicle distance information.

In the above-described fourth embodiment, the first period p1 is made longer when the distance between the vehicle and another vehicle is short for a preset period. For example, if the vehicle is tailgated by another vehicle, a sign triggering occurrence of an event may arise before a conventional retroactive recording period in some times. By inclusively recording such a sign of occurrence of an event, a situation such as a cause of an accident can be grasped.

Fifth Embodiment

Next, a fifth embodiment will be described. The fifth embodiment is different from the fourth embodiment in that the traveling information further includes vehicle velocity information in addition to the information on an inter-vehicle distance from a vehicle that is traveling in front of or in back of the vehicle. Note that a description of matters overlapping with the already described matters will be omitted as appropriate.

FIG. 12 is a table showing an example of settings in the recording control unit 116 according to the fifth embodiment. The recording control unit 116 acquires a traveling velocity v of the vehicle and an inter-vehicle distance d at a time point as far back as a preset period before the time te0 at which an event was detected. In FIG. 12, if the traveling velocity v is less than V1 (for example, less than 30 kilometers per hour), the first period p1 is set to Ps (for example, 10 seconds), regardless of the inter-vehicle distance d. If the traveling velocity v is equal to or more than V1 (for example, equal to or more than 30 kilometers per hour) and if the inter-vehicle distance d is equal to or more than D1 (for example, equal to or more than 15 meters), the first period p1 is set to Ps (for example, 10 seconds). If the traveling velocity v is equal to or more than V1 (for example, equal to or more than 30 kilometers per hour) and if the inter-vehicle distance d is less than D1 (for example, equal to or less than 15 meters) and is equal to or more than D2 (for example, equal to or more than seven meters), the first period p1 is set to Pm (for example, 20 seconds) that is longer than Ps. If the traveling velocity v is equal to or more than V1 (for example, equal to or more than 30 kilometers per hour) and if the inter-vehicle distance d is less than D2 (for example, less than seven meters), the first period p1 is set to Pf (for example, 30 seconds). Note that the specific velocities and periods recited here are only examples, as a matter of course. Accordingly, the second period p2 may be changed with values of the traveling velocity v or the inter-vehicle distance d.

Figure 13:
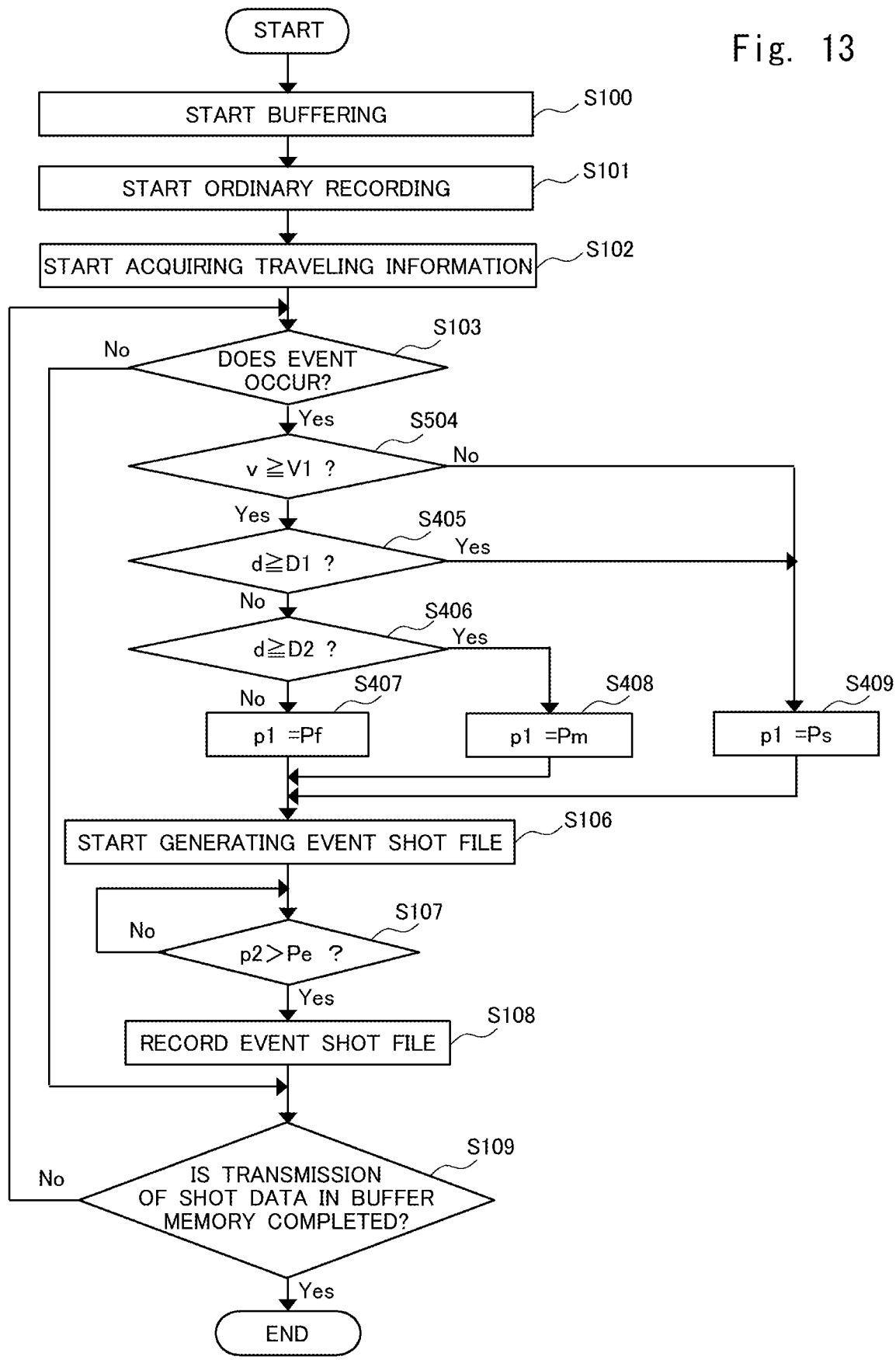
FIG. 13 is a flowchart in the recording control device 110 according to the fifth embodiment.

Next, processing in the recording control device 110 according to the fifth embodiment will be described with reference to FIG. 13. FIG. 13 is a flowchart in the recording control device 110 according to the fourth embodiment. In the flowchart shown in FIG. 13, processing from step S100 to step S103 and from step S106 to step S109 is similar to the processing in the flowchart according to the first embodiment shown in FIG. 4. Therefore, a description of the processing overlapping with the processing in the first embodiment will be omitted here as appropriate.

First, when the recording apparatus is activated, the buffer memory 112 starts storing, that is, buffering, shot data (step S100). Thereafter, processing up to step S103 is similar to the processing in the first embodiment.

In step S103, if the recording control unit 116 determines that an event is detected (step S103: Yes), the recording control unit 116 determines whether or not the traveling velocity v of the vehicle is equal to or more than V1 (step S504).

If the recording control unit 116 does not determine that the traveling velocity v is equal to or more than V1 (step S504: No), the recording control unit 116 sets the first period p1 to Ps based on the settings in the table shown in FIG. 9 (step S409). On the other hand, if the recording control unit 116 determines that the traveling velocity v is equal to or more than V1 (step S504: Yes), the recording control unit 116 further determines whether or not the inter-vehicle distance d is equal to or more than D1 (step S405).

If the recording control unit 116 determines that the inter-vehicle distance d is equal to or more than D1 (step S405: Yes), the recording control unit 116 sets the first period p1 to Ps (step S409). On the other hand, if the recording control unit 116 does not determine that the inter-vehicle distance d is equal to or more than D1 (step S405: No), the recording control unit 116 further determines whether or not the inter-vehicle distance d is equal to or more than D2 (step S406).

If the recording control unit 116 determines that the inter-vehicle distance d is equal to or more than D2 (step S406: Yes), the recording control unit 116 sets the first period p1 to Pm (step S408). On the other hand, if the recording control unit 116 does not determine that the inter-vehicle distance d is equal to or more than D2 (step S406: No), the recording control unit 116 sets the first period p1 to Pf, as a setting in the case where the inter-vehicle distance d is less than D2 (step S407).

When the processing of setting the first period p1 is thus completed, subsequently, the recording control unit 116 starts generating an event shot file (step S106). Processing thereafter is similar to the processing in the first embodiment.

As described above, the recording control unit 116 can make the first period p1 longer based on the acquired information on the traveling velocity and the inter-vehicle distance.

In the above-described fifth embodiment, the first period p1 is made longer if the vehicle is traveling at a preset traveling velocity or higher in a state where the distance between the vehicle and another vehicle is short for a preset period. For example, if a dangerous inter-vehicle distance continues while the vehicle is traveling, such as when the vehicle is tailgated by another vehicle, except for a case where the inter-vehicle distance from another vehicle is narrowed due to congestion or the like, a sign triggering occurrence of an event may arise before a conventional retroactive recording period. Accordingly, by appropriately recording such a sign of occurrence of an event, a situation such as a cause of an accident can be grasped.

Sixth Embodiment

Figure 14:
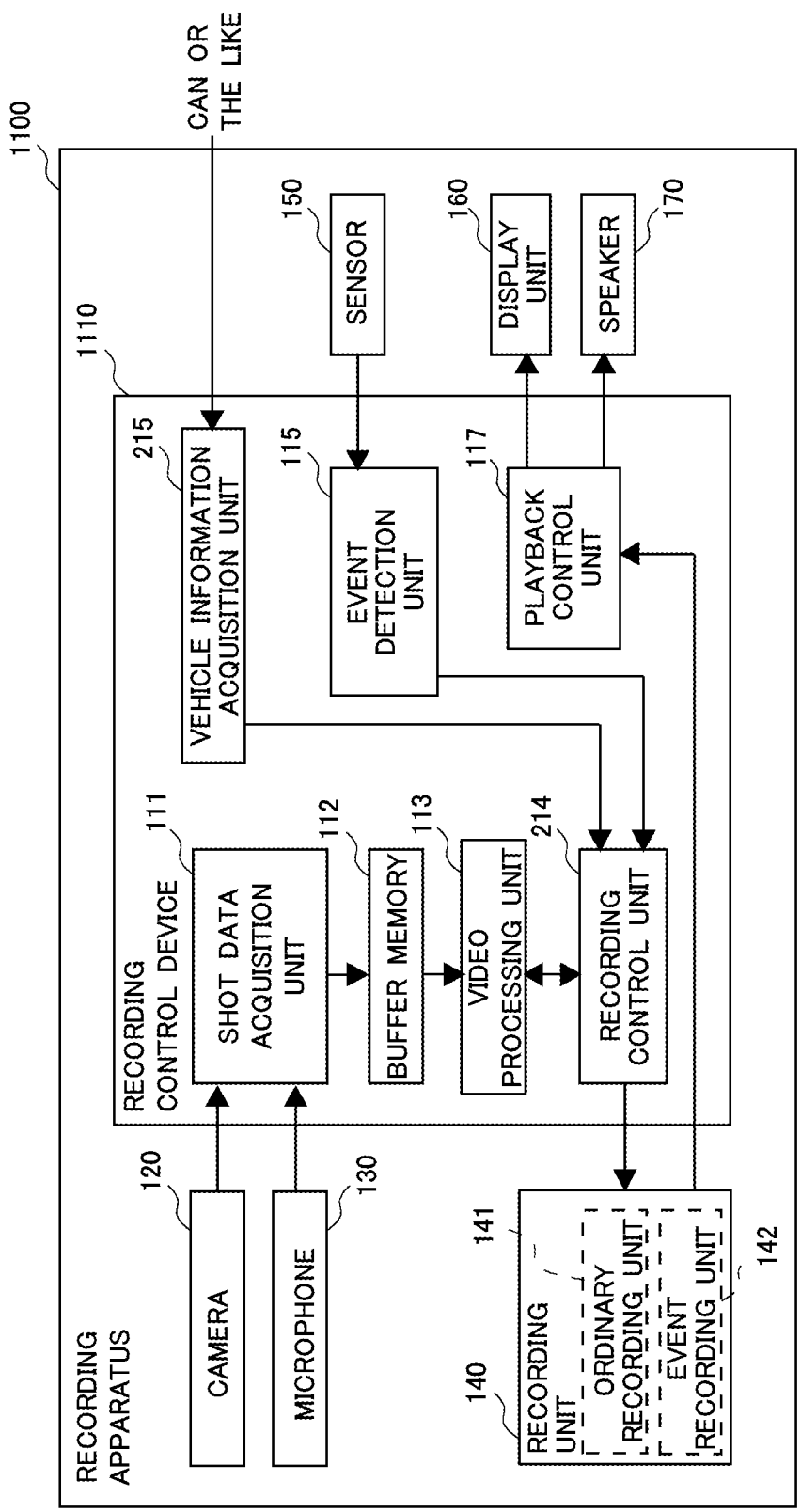
FIG. 14 is a functional block diagram of a recording apparatus 110 according to a sixth embodiment.

Next, a sixth embodiment will be described with reference to drawings. FIG. 14 is a functional block diagram of a recording apparatus 1100 according to the sixth embodiment. Note that in the following description and drawings, constituent elements that are substantially the same as the constituent elements described in the above embodiments are denoted by common reference signs. Therefore, a description of the constituent elements denoted by the common reference signs will be omitted as appropriate.

The recording apparatus 1100 acquires video data that is video data obtained by shooting surroundings of a vehicle, and records the acquired video data in the recording unit 140 based on a preset condition. The recording apparatus 1100 can be implemented, for example, as part of functions of a navigation system, a driving recorder, and the like that can be installed in the vehicle. A recording control device 1110 can be implemented, for example, as part of a system that is incorporated in a vehicle when the vehicle is assembled at a plant. The recording control device 1110 may also be implemented, for example, by combining a system that is incorporated in a vehicle when the vehicle is assembled at a plant with an apparatus that is retrofittable to the vehicle.

The recording apparatus 1100 can be implemented as an apparatus in various forms, such as a computer apparatus that operates by a processor executing a program stored in a memory. The processor is, for example, a microprocessor, an MPU (Micro Processing Unit), or a CPU (Central Processing Unit). The memory is a volatile memory or a non-volatile memory, and may be configured by combining a volatile memory and a non-volatile memory. The processor executes one or more programs including instructions for causing a computer to perform processing, which will be described below using drawings.

The recording apparatus 1100 includes the recording control device 1110, the camera 120, the microphone 130, the recording unit 140, the sensor 150, the display unit 160, and the speaker 170. The recording control device 1110 is communicably connected to equipment in the vehicle through an in-vehicle communication network such as a CAN (Controller Area Network). The recording control device 1110 and each of the camera 120, the microphone 130, the recording unit 140, the sensor 150, the display unit 160, and the speaker 170 may be directly connected to each other by using a predetermined cable or the like, or may be connected through the in-vehicle network such as a CAN. Note that "such as a CAN" is not limited to a CAN, but means that the in-vehicle network may be any other in-vehicle network such as a MOST (Media Oriented Systems Transport) or a LIN (Local Interconnect Network).

Next, an example of a configuration of the recording control device 1110 will be described. The recording control device 1110 includes the shot data acquisition unit 111, the buffer memory 112, the video processing unit 113, a recording control unit 214, a vehicle information acquisition unit 215, the event detection unit 115, and the playback control unit 117. Each constituent element included in the recording control device 1110 is, for example, software stored in the memory. Each constituent element included in the recording control device 1110 may be hardware such as a circuit or a chip. Each constituent element included in the recording control device 1110 may be a combination of software and hardware.

The recording control unit 214 sends an instruction to the video processing unit 113 and causes the video processing unit 113 to generate an ordinary shot file. The ordinary shot file is a shot file that is not derived from an event detected by the event detection unit 115. When the recording control unit 214 receives vehicle information outputted by the vehicle information acquisition unit 215 and information outputted by the event detection unit 115, the recording control unit 214 sends an instruction to the video processing unit 113 and causes the video processing unit 113 to generate an event shot file. The event shot file is a shot file derived from an event detected by the event detection unit 115. The recording control unit 214 outputs the ordinary shot file or the event shot file generated by the video processing unit 113 to the recording unit 140. The recording control unit 214 may output to the video processing unit 113, for example, a file name, file type information, and the like as header information on the ordinary shot file or the event shot file.

The recording control unit 214 may output information on a driver assistance function to the video processing unit 113, based on the information outputted by the vehicle information acquisition unit 215. In this case, for example, the video processing unit 113 may generate an event shot file, in the header of which the type of the driver assistance function in operation is written. The video processing unit 113 may configure video data of the event shot file to display the type of the driver assistance function in operation by using character information, an icon, or the like. That is, the recording control unit 214 may record type information on the driver assistance function in operation along with the video data. The recording control unit 214 may determine starting time and ending time of a shot file and outputs the starting time and the ending time to the video processing unit 113.

The recording control unit 214 records the event shot file and the ordinary shot file in the recording unit 140 distinctively from each other. "Records the event shot file and the ordinary shot file in the recording unit 140 distinctively from each other" may refer to the recording control unit 214 setting flag information or the like indicative of an event shot file in the header or the payload of the event shot file. The recording control unit 214 may also set flag information or the like indicative of an ordinary shot file in the header or the payload of the ordinary shot file, or does not need to set flag information. That is, shot data on which no flag information is set may be recognized as an ordinary shot file. Conversely, if flag information indicative of an ordinary shot file is set in the header or the payload of the ordinary shot file, flag information does not need to be set on the event shot file. The recording control unit 214 may have the ordinary shot file recorded in the ordinary recording unit 141 and may have the event shot file recorded in the event recording unit 142.

The recording control unit 214 may record the event shot file in the recording unit 140 as overwriting-disallowed data. For example, the recording control unit 214 may record the event shot file in the recording unit 140, with a designation of an address of a memory area where overwriting of data is disallowed within the recording unit 140. Alternatively, the recording control unit 214 may set flag information or the like indicating that overwriting is disallowed in the header or the payload of the event shot file. The address of the memory area where overwriting of data is disallowed within the recording unit 140 may coincide with an address of a memory area where the event shot file is recorded within the recording unit 140, or any one of the memory areas may be included in the other memory area.

The recording control unit 214 may record the ordinary shot file in the recording unit 140 as overwriting-allowed data. For example, the recording control unit 214 may record the ordinary shot file in the recording unit 140, with a designation of an address of a memory area where overwriting of data is allowed within the recording unit 140. Alternatively, the recording control unit 214 may set flag information or the like indicating that overwriting is allowed in the header or the payload of the ordinary shot file. The address of the memory area where overwriting of data is allowed within the recording unit 140 may coincide with an address of a memory area where the ordinary shot file is recorded within the recording unit 140, or any one of the memory areas may be included in the other memory area.

The vehicle information acquisition unit 215 acquires information on the vehicle received via the in-vehicle network such as a CAN and outputs the information to the recording control unit 214. The vehicle information acquisition unit 215 acquires information on the vehicle, for example, in every preset period. The information on the vehicle acquired by the vehicle information acquisition unit 215 includes, for example, a vehicle traveling velocity, an inter-vehicle distance from nearby vehicles, a vehicle steering angle, GPS information, driver assistance function information, and the like.

The driver assistance function information is information including a type and an operating state of a driver assistance function included in the vehicle. Note that in the present description, a driver assistance function refers to a function of keeping the vehicle in a traveling-capable state while control by a driver is not involved in at least one of vehicle operations to be performed by the driver, namely, accelerating, braking, or steering of the vehicle. Driver assistance functions include, for example, an adaptive cruise control function, a lane keeping assist function, an autocruise function, an automatic parking function, an automatic braking function such as a collision avoidance braking system, an automated driving function, and the like. That is, the driver assistance function information is, for example, information indicating that the adaptive cruise control function is on, indicating that the autocruise function is on, or the like.

The event detection unit 115, upon receiving the information outputted by the sensor 150, detects occurrence of a preset event. When the event detection unit 115 detects occurrence of the event, the event detection unit 115 outputs information indicative of occurrence of the event to the recording control unit 214. The information indicative of occurrence of the event may include a time of day at which the event occurred. Further, the information indicative of occurrence of the event may include values of acceleration from a time point as far back as a preset period before the time of day at which the event occurred until the time of day at which the event occurred, and the like.

Next, a relationship between a shot file and time in the sixth embodiment will be described. The relationship between a shot file and time in the sixth embodiment is similar to the relationship between a shot file outputted by the recording control device 110 and time described with reference to FIG. 2. The recording control unit 214 outputs an ordinary shot file Fn(0) generated by the video processing unit 113 to the ordinary recording unit 141 included in the recording unit 140. Subsequently, the video processing unit 113 generates shot data obtained from time tn1 until time tn2 as an ordinary shot file Fn(1) and outputs the ordinary shot file Fn(1) to the recording control unit 214. Similarly, the video processing unit 113 generates an ordinary shot file Fn(2) starting from the time tn2 and outputs the ordinary shot file Fn(2) to the recording control unit 214.

Here, a principle of how an event shot file Fe is generated will be described. First, when an event occurs such as a strong impact being exerted on the vehicle, the event detection unit 115 detects the event at time te0, which is immediately after occurrence of the event. The event detection unit 115 outputs information indicating occurrence of the event to the recording control unit 214. The recording control unit 214, upon receiving the information outputted by the event detection unit 115, instructs the video processing unit 113 to generate shot data obtained from time te1 until time te2 in the form of a file. The time te1 is a time of day as far back as the first period p1 before the time te0 at which the event was detected. The time te2 is a time of day at which the second period p2 has passed since the time te0 at which the event was detected. The video processing unit 113, upon receiving an instruction from the recording control unit 214, generates shot data obtained from the time te1 until the time te2 outputted from the buffer memory 112 as an event shot file Fe and outputs the event shot file Fe to the recording control unit 214. The recording control unit 214 outputs the event shot file Fe received from the video processing unit 113 to the recording unit 140. Note that the event shot file Fe may include information indicating that overwriting is disallowed in the header or the payload. An area where the event shot file Fe is recorded may be a designated area where overwriting is disallowed.

The event shot file Fe thus recorded includes the shot data obtained from the time te1 as far back as the first period p1 before the time te0 at which the event was detected until the time point of occurrence of the event. Shot data is recorded from a time point as far back as a preset period before a time point of occurrence of an event, whereby an event shot file can provide a clue for identifying a cause of occurrence of the event.

By the way, when an event such as a traffic accident occurs to a vehicle having a driver assistance function, the recording apparatus 1100 is expected to be able to identify whether or not the event that has occurred is attributable to the driver assistance function. Accordingly, the recording control unit 214 can set the length of the first period p1 based on vehicle information outputted by the vehicle information acquisition unit 215.

For example, when an event is detected, the recording control unit 214 can detect, from the vehicle information acquisition unit 215, that a driver assistance function of the vehicle was operating. More specifically, the recording control unit 214 acquires vehicle information immediately before the time te0 at which the event was detected. "Immediately before" here refers to a timing that allows vehicle information at the time of occurrence of the event to be determined, and the vehicle information is, for example, vehicle information acquired at a time point as far back as a preset period before the time te0 at which the event was detected. Examples of the preset period include one second, five seconds, 10 seconds, and the like. The preset period may be 0 seconds.

The recording control unit 214, based on the acquired vehicle information, can set the longer first period p1 when it is detected that the driver assistance function was operating than when it is not detected that the driver assistance function was operating.

When detecting that the driver assistance function was operating, the recording control unit 214 may perform determination based on vehicle information for a preset period, in place of the vehicle information at the preset time point. In this case, for example, the recording control unit 214 acquires all vehicle information for the preset period and can detect whether or not a preset proportion or more of the acquired all vehicle information includes information indicating that the driver assistance function was operating.

FIG. 15 is a table showing an example of settings in the recording control unit 214 according to the sixth embodiment. The recording control unit 214 acquires vehicle information at a time point as far back as the preset period before the time te0 at which the event was detected. The recording control unit 214 can detect a state of a driver assistance function AST included in the acquired vehicle information. If the driver assistance function AST is off (AST: OFF), the first period p1 is set to a period Ps (for example, 10 seconds). On the other hand, if the driver assistance function AST is on (AST: ON), the first period p1 is set to a period Pf (for example, 60 seconds). Note that the second period p2 is set to a period Pe (for example, 10 seconds) in any case. Note that the specific periods recited here are only examples, as a matter of course. Accordingly, the second period p2 may be changed depending on the state of the driver assistance function AST.

Figure 16:
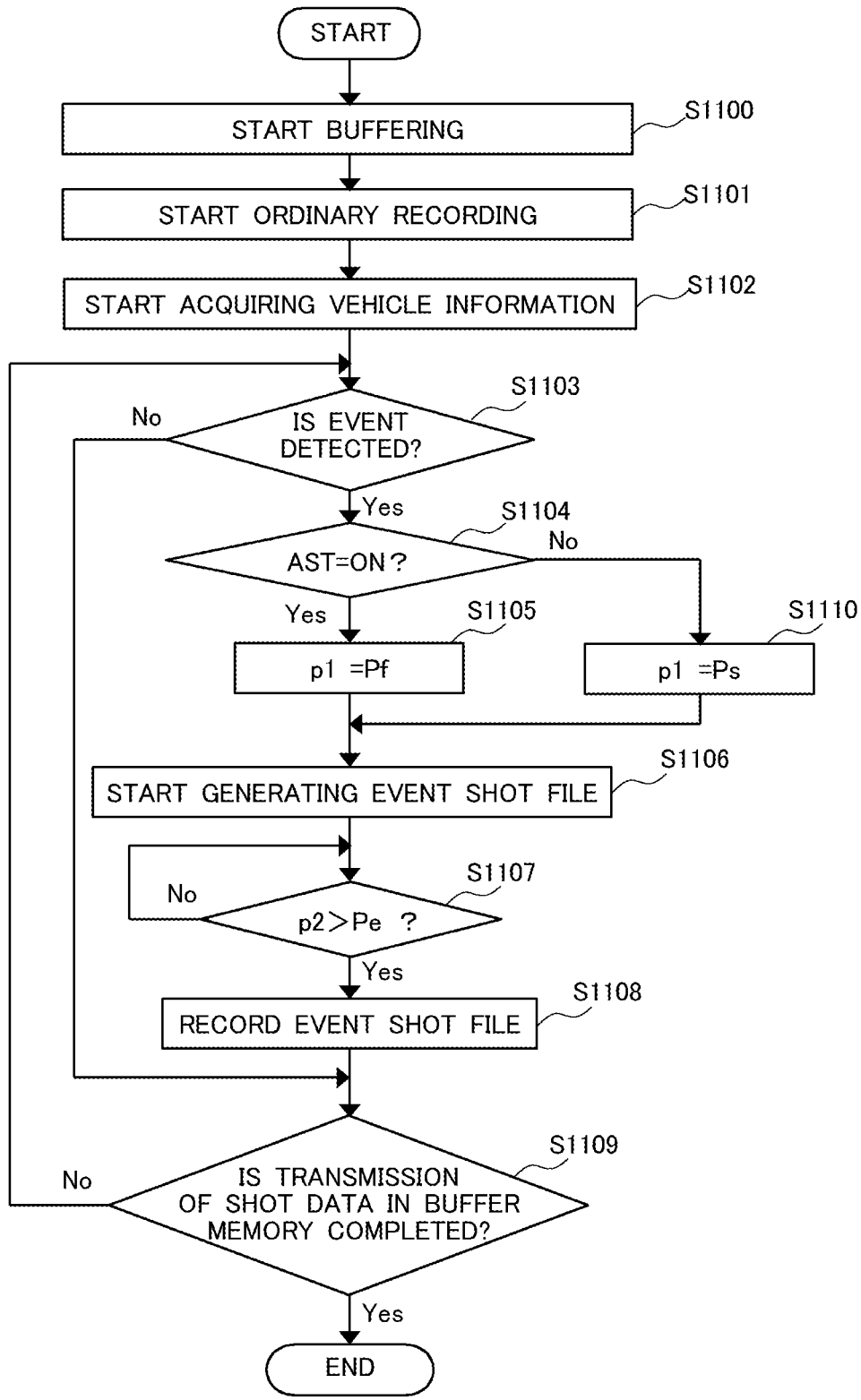
FIG. 16 shows a flowchart in a recording control device 1110 according to the sixth embodiment.

Next, processing in the recording control device 1110 will be described with reference to FIG. 16. FIG. 16 is a flowchart showing the processing in the recording control device 1110 according to the sixth embodiment.

First, when the recording apparatus 1100 is activated, the shot data acquisition unit 111 acquires shot data including at least video data and outputs the shot data to the buffer memory 112. The buffer memory 112 starts storing, that is, buffering, the shot data (step S1100).

Subsequently, the recording control unit 214 starts processing of causing the video processing unit 113 to generate an ordinary shot file and outputting the ordinary shot file to the recording unit 140, as described with reference to FIG. 2 (step S1101). Note that the processing in which the video processing unit 113 generates an ordinary shot file and the recording control unit 214 outputs the ordinary shot file to the recording unit 140 is ordinary recording. The video processing unit 113 and the recording control unit 214 continue ordinary recording until the series of processing shown in FIG. 4 is completed. The recording unit 140 sequentially records the ordinary shot files outputted by the recording control unit 214. In addition to performing the above-described processing, the video processing unit 113 and the recording control unit 214 may parallelly perform processing of generating an event shot file and outputting the event shot file to the recording unit 140, which will be described below.

Subsequently, the recording control unit 214 acquires vehicle information outputted by the vehicle information acquisition unit 215 in every preset period (for example, 100 milliseconds) (step S1102). Note that the recording control unit 214 may store the vehicle information corresponding to every preset period in the memory included in the recording control device 1110.

Subsequently, the recording control unit 214 monitors information outputted from the event detection unit 115 in every preset period (for example, 100 milliseconds), and determines whether or not an event is detected (step S1103). If the recording control unit 214 does not determine that an event is detected (step S1103: No), the recording control unit 214 determines whether or not all shot data stored in the buffer memory 112 is transmitted to the video processing unit 113 (step S1109). On the other hand, if the recording control unit 214 determines that an event is detected (step S1103: Yes), the recording control unit 214 moves on to processing of determining the first period p1 to generate an event shot file.

The recording control unit 214 monitors information from the vehicle information acquisition unit 215 and acquires an operating state of the driver assistance function (AST) based on the vehicle information at the preset time point or for the preset period. The recording control unit 214 then determines whether or not the driver assistance function was operating (step S1104).

If the recording control unit 214 detects that the driver assistance function was operating (AST: ON) (step S1104: Yes), the recording control unit 214 sets the first period p1 to the period Pf (step S1105). On the other hand, if the recording control unit 214 does not detect that the driver assistance function was operating (AST: ON) (step S1104: No), the recording control unit 214 sets the first period p1 to the period Ps (step S1110).

The recording control unit 214, upon setting the first period p1, sends an instruction to the video processing unit 113 and causes the video processing unit 113 to generate an event shot file (step S1106).

Subsequently, the recording control unit 214 monitors time and determines whether or not the second period p2 exceeds the preset period Pe (step S1107). If the recording control unit 214 does not determine that the second period p2 exceeds the period Pe (step S1107: No), the recording control unit 214 causes the video processing unit 113 to continue generating the event shot file. On the other hand, if the recording control unit 214 determines that the second period p2 exceeds the period Pe (step S1107: Yes), the recording control unit 214 causes the video processing unit 113 to stop generating the event shot file, and outputs the event shot file generated by the video processing unit 113 to the recording unit 140 (step S1108).

When recording of the event shot file is completed, the recording control unit 214 determines whether or not all shot data in the buffer memory 112 is transmitted to the video processing unit 113 (step S1109). If the recording control unit 214 determines that all shot data in the buffer memory 112 is transmitted to the video processing unit 113 (step S1109: Yes), the recording control unit 214 terminates the processing. "All shot data in the buffer memory 112 is transmitted to the video processing unit 113" refers to, for example, a case where the driver performs an operation to stop the camera 120 shooting, or a case where an engine is stopped, so that shooting by the camera 120 is stopped, or the like.

On the other hand, if the recording control unit 214 does not determine that all shot data in the buffer memory 112 is transmitted to the video processing unit 113 (step S1109: No), the recording control unit 214 repeats the processing of monitoring information outputted from the event detection unit 115 and determining whether or not an event is detected (step S1103), in addition to continuing recording an ordinary shot file.

With a configuration as described above, the recording apparatus 1100 can set the longer first period p1 when a driver assistance function is operating than when the driver assistance function is not operating. Accordingly, the recording apparatus 1100 according to the sixth embodiment can appropriately record an incident triggering a traffic accident or the like.

Driver assistance functions to which the above-described sixth embodiment is applied are not limited. However, among driver assistance functions, the sixth embodiment is particularly suitable for driver assistance functions that are completed in a relatively short time. The driver assistance functions that are completed in a relatively short time include, for example, an automatic parking function, an automatic braking function, and the like.

Seventh Embodiment

Next, a seventh embodiment will be described. A functional configuration of a recording apparatus according to the seventh embodiment is similar to the functional configuration of the recording apparatus 1100 according to the sixth embodiment. The recording apparatus 1100 according to the seventh embodiment is different from the sixth embodiment in settings of the first period p1 in the recording control unit 214 and processing of shot data in the video processing unit 113.

Figure 17A:
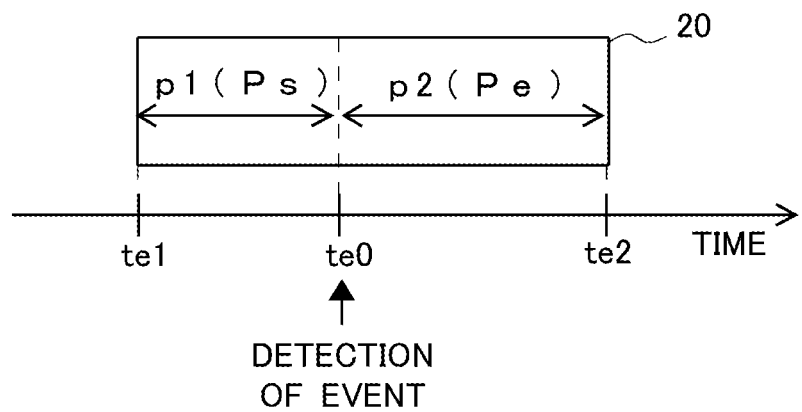
FIG. 17A shows a relationship between a file outputted by the recording control device 1110 and time according to a seventh embodiment.
Figure 17B:
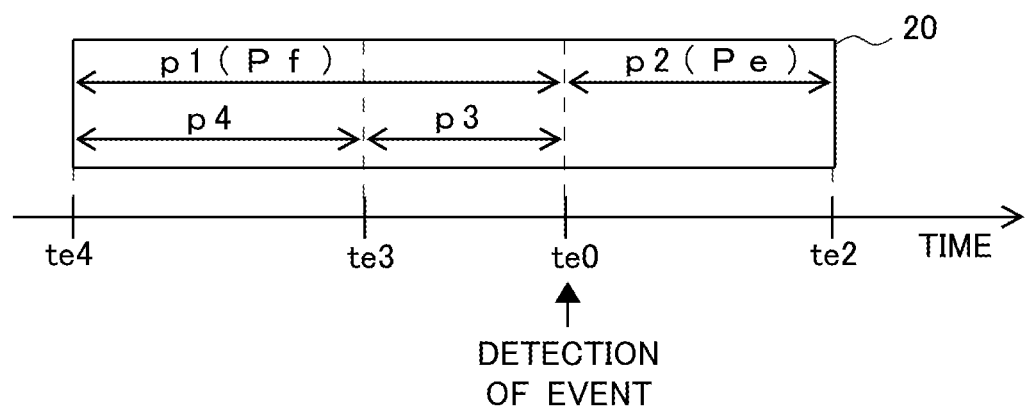
FIG. 17B shows a relationship between a file outputted by the recording control device 1110 and time according to the seventh embodiment.

The recording control device 1110 according to the seventh embodiment will be described with reference to FIGS. 17A and 17B. FIGS. 17A and 17B each shows a relationship between a file outputted by the recording control device 1110 according to the seventh embodiment and time. The recording control unit 214 causes the video processing unit 113 to generate, as an event shot file, shot data obtained from a time point as far back as the first period p1 before time of detection of an event until a time point at which the second period p2 has passed since the time of detection of the event. FIG. 17A shows a file 20 generated when the recording control unit 214 determines that the first period p1 is the period Ps. FIG. 17B shows a file 20 generated when the recording control unit 214 determines that the first period p1 is the period Pf.

In FIG. 17A, the recording control unit 214 causes the video processing unit 113 to generate shot data obtained for a period from time te1 to time te2 as an event shot file. At the time of detection of the event, if the recording control unit 214 does not detect, from the vehicle information acquisition unit 215, that a driver assistance function of the vehicle was operating, the recording control unit 214 determines that the first period p1 is the period Ps. The period Ps is a period from the time te1 to time te0. The time te1 is a time point as far back as the period Ps before the time te0 at which the event was detected. The period Pe is a period from the time te0 to the time te2. The time te2 is a time point at which the period Pe has passed since the time te0 at which the event was detected.

In FIG. 17B, the recording control unit 214 causes the video processing unit 113 to generate shot data obtained for a period from time te4 to the time te2 as an event shot file. At the time of detection of the event, if the recording control unit 214 detects, from the vehicle information acquisition unit 215, that a driver assistance function of the vehicle was operating, the recording control unit 214 determines that the first period p1 is the period Pf. The period Pf is set longer than the period Ps shown in FIG. 17A. In the case of the example shown in FIG. 17B, the recording control unit 214 performs processing, with the first period p1 divided into a fourth period p4 and a third period p3. The fourth period p4 is a period from the time te4 to time te3. That is, the fourth period p4 is a period, within the first period p1, from the time te4, which is a starting time point of the first period p1, until the time te3, which is a starting time point of the third period p3. The third period p3 is a period from the time te3 to the time te0. The time te4 is a time point as far back as the period Pf before the time te0. The time te3 is a time point as far back as the third period p3 before the time te0. The time te3 can also be said to be a time point at which the fourth period p4 has passed since the time te4.

The recording control unit 214 according to the seventh embodiment can cause the video processing unit 113 to make a frame rate of shot data obtained for the fourth period p4 lower than a frame rate of shot data obtained for the third period p3, within the first period p1. That is, in an event shot file, the frame rate of the shot data in the fourth period p4 is lower than the frame rate in the third period p3 and the second period p2. More specifically, for example, the frame rate of the shot data in the fourth period p4 may be 1 fps (frames per second), 2 fps, or the like. Note that a frame rate of video data acquired by the shot data acquisition unit 111 is, for example, 15 to 30 fps.

Figure 18:
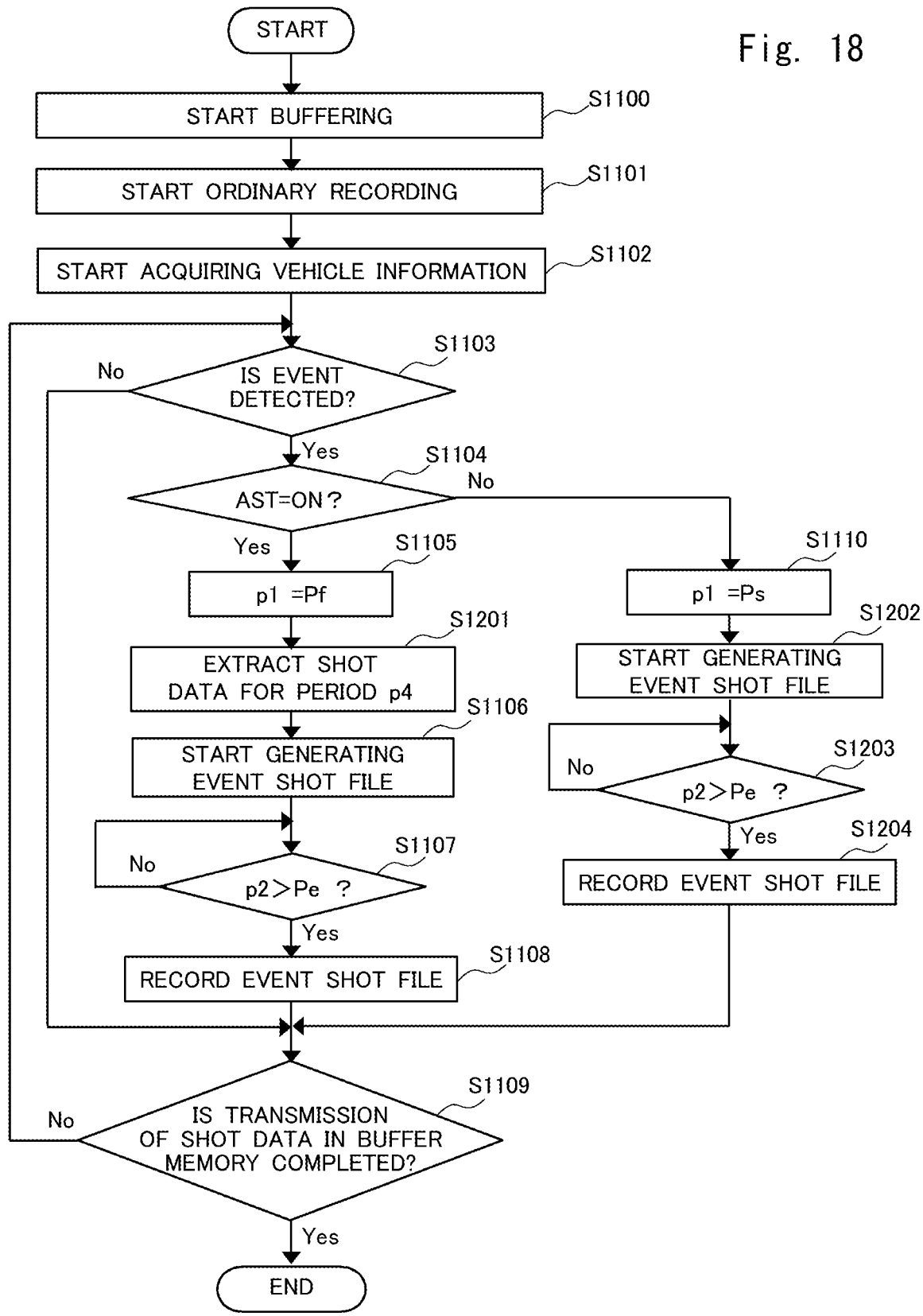
FIG. 18 shows a flowchart in the recording control device 1110 according to the seventh embodiment.

Next, processing in the recording control device 1110 according to the seventh embodiment will be described with reference to FIG. 18. FIG. 18 is a flowchart showing the processing in the recording control device 1110 according to the seventh embodiment. The flowchart in the recording control device 1110 according to the seventh embodiment is different from the flowchart in the recording control device 1110 according to the sixth embodiment in processing between step S1104 and step S1109. Accordingly, a description of overlapping parts will be omitted as appropriate.

In the flowchart shown in FIG. 18, processing from step S1100 to step S1104 is similar to the processing in the flowchart according to the sixth embodiment shown in FIG. 16.

In step S1104, the recording control unit 214 monitors information from the vehicle information acquisition unit 215 and acquires an operating state of a driver assistance function (AST) based on vehicle information at a preset time point or during a preset period. The recording control unit 214 then determines whether or not the driver assistance function was operating (step S1104).

If the recording control unit 214 determines that the driver assistance function was operating (AST: ON) (step S1104: Yes), the recording control unit 214 sets the first period p1 to the period Pf (step S1105).

Subsequently, the recording control unit 214 causes the video processing unit 113 to generate shot data obtained by intermittently or successively extracting frames from shot data obtained for the fourth period p4. That is, the video processing unit 113 performs processing of extracting shot data for the fourth period p4 (step S1201).

Subsequently, the recording control unit 214 generates an event shot file from the shot data for the fourth period p4, the third period p3, and the second period p2 (step S1106). Note that a combined period of the fourth period p4 and the third period p3 is the first period p1.

Subsequently, the recording control unit 214 monitors time and determines whether or not the second period p2 exceeds the preset period Pe (step S1107). If the recording control unit 214 does not determine that the second period p2 exceeds the preset period Pe (step S1107: No), the recording control unit 214 causes the video processing unit 113 to continue generating the event shot file. On the other hand, if the recording control unit 214 determines that the second period p2 exceeds the preset period Pe (step S1107: Yes), the recording control unit 214 causes the video processing unit 113 to stop generating the event shot file, and outputs the event shot file generated by the video processing unit 113 to the recording unit 140 (step S1108).

On the other hand, if the recording control unit 214 does not determine that the driver assistance function was operating (AST: ON) (step S1104: No), the recording control unit 214 sets the first period p1 to the period Ps (step S1110).

The recording control unit 214, upon determining the first period p1, causes the video processing unit 113 to generate an event shot file from the shot data obtained for the first period p1 and the second period p2 (step S1202).

Subsequently, the recording control unit 214 monitors time and determines whether or not the second period p2 exceeds the preset period Pe (step S1203). If the recording control unit 214 does not determine that the second period p2 exceeds the preset period Pe (step S1203: No), the recording control unit 214 causes the video processing unit 113 to continue generating the event shot file. On the other hand, if the recording control unit 214 determines that the second period p2 exceeds the preset period Pe (step S1203: Yes), the recording control unit 214 causes the video processing unit 113 to stop generating the event shot file, and outputs the event shot file generated by the video processing unit 113 to the recording unit 140 (step S1204).

When recording of the event shot file is completed, the recording control unit 214 determines whether or not all shot data in the buffer memory 112 is transmitted to the video processing unit 113 (step S1109). Processing thereafter is similar to the processing in the flowchart according to the sixth embodiment shown in FIG. 16.

Note that the video processing unit 113 may parallelly perform the processing of generating an ordinary shot file and the processing of generating an event shot file. The video processing unit 113 may sequentially perform the processing of generating an ordinary shot file and the processing of generating an event shot file.

With a configuration as described above, the recording apparatus 1100 according to the seventh embodiment can generate an event shot file as far back as a longer period when an event occurs to a vehicle in which a driver assistance function is operating, than in a case where the driver assistance function is not operating. The recording apparatus 1100 according to the seventh embodiment can prevent recording capacity and time from increasing by lowering the frame rate of shot data for the fourth period p4, which is a period preceding the preset third period p3, and can appropriately record incidents before and after occurrence of an event.

Driver assistance functions to which the above-described seventh embodiment is applied are not limited. However, among driver assistance functions, the seventh embodiment is particularly suitable for driver assistance functions that keep functioning for a long time and are turned on/off while the vehicle is being driven. The driver assistance functions that keep functioning for a long time and are turned on/off while the vehicle is being driven include, for example, an adaptive cruise control function, a lane keeping assist function, an autocruise function, and the like.

Eighth Embodiment

Next, an eighth embodiment will be described. A functional configuration of a recording apparatus according to the eighth embodiment is similar to the functional configuration of the recording apparatus 1100 according to the sixth and seventh embodiments. The recording apparatus 1100 according to the eighth embodiment is different from the seventh embodiment in settings of the first period p1 in the recording control unit 214. Upon detection of an event, if the recording control unit 214 of the recording apparatus 1100 according to the eighth embodiment detects that a driver assistance function was operating, the recording control unit 214 sets the starting time te4 of the fourth period p4 at a time point at which the driver assistance function started operating.

Figure 19:
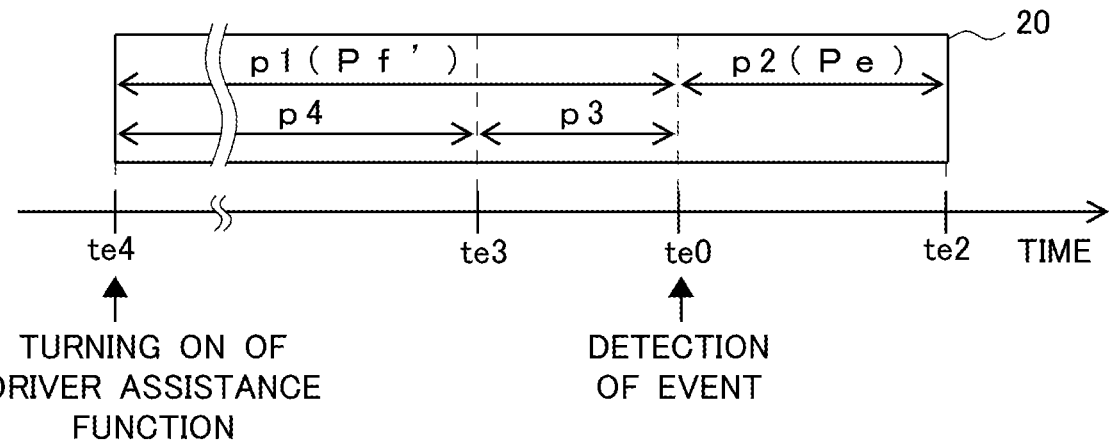
FIG. 19 shows a relationship between a file outputted by the recording control device 1110 and time according to an eighth embodiment.

The recording control device 1110 according to the eighth embodiment will be described with reference to FIG. 19. FIG. 19 shows a relationship between a file outputted by the recording control device 1110 according to the eighth embodiment and time. FIG. 19 includes a file 20 generated when the recording control unit 214 determines that the first period p1 is a period Pf. That is, the file 20 is an event shot file.

In FIG. 19, the recording control unit 214 causes the video processing unit 113 to generate shot data obtained for a period from time te4 to time te2 as an event shot file. Upon detection of an event, if the recording control unit 214 detects, from the vehicle information acquisition unit 215, that a driver assistance function of the vehicle was operating, the recording control unit 214 determines that the first period p1 is the period Pf. Note that the period Pf is longer than the period Ps, which is the first period in a case where the driver assistance function was not operating (not shown), similarly to the case of the recording apparatus 1100 according to the seventh embodiment, as a matter of course.

In the case of the example shown in FIG. 19, the recording control unit 214 performs processing, with the first period p1 divided into a fourth period p4 and a third period p3. The fourth period p4 is a period from the time te4 to time te3. The third period p3 is a period from the time te3 to time te0. The time te4 is a time point at which the driver assistance function started operating. That is, in the eighth embodiment, the fourth period p4 is not a fixed period. Accordingly, the period Pf, which is the first period p1, is not a fixed period. The time te3 is a time point as far back as the third period p3 before the time te0. The third period p3 is a preset period and can be a fixed period.

Note that the event shot file shown in FIG. 19 can be generated from shot data temporarily stored in the buffer memory 112. In other words, the video processing unit 113 can generate an event shot file from shot data obtained for a period determined by the recording control unit 214, among shot data temporarily stored in the buffer memory 112. That is, it can be said that the length of an event shot file is shorter than the length of shot data temporarily stored in the buffer memory 112.

With a configuration as described above, the recording apparatus 1100 according to the eighth embodiment can set the fourth period p4, which is a period preceding the preset third period p3, depending on an operating state of the driver assistance function. Thus, the recording apparatus 1100 according to the eighth embodiment can appropriately record incidents before and after occurrence of an event.

Driver assistance functions to which the above-described eighth embodiment is applied are not limited. However, the eighth embodiment is particularly suitable for driver assistance functions that are turned on/off while the vehicle is being driven. The driver assistance functions that are turned on/off during the vehicle is being driven include, for example, an automatic parking function, an automatic braking function, an adaptive cruise control function, a lane keeping assist function, an autocruise function, and the like.

Ninth Embodiment

Next, a ninth embodiment will be described. A functional configuration of a recording apparatus according to the ninth embodiment is similar to the functional configuration of the recording apparatus 1100 according to the sixth to eighth embodiments. The recording apparatus 1100 according to the ninth embodiment is different from the eighth embodiment in processing of shot data for the fourth period p4 in the recording control unit 214.

Figure 20:
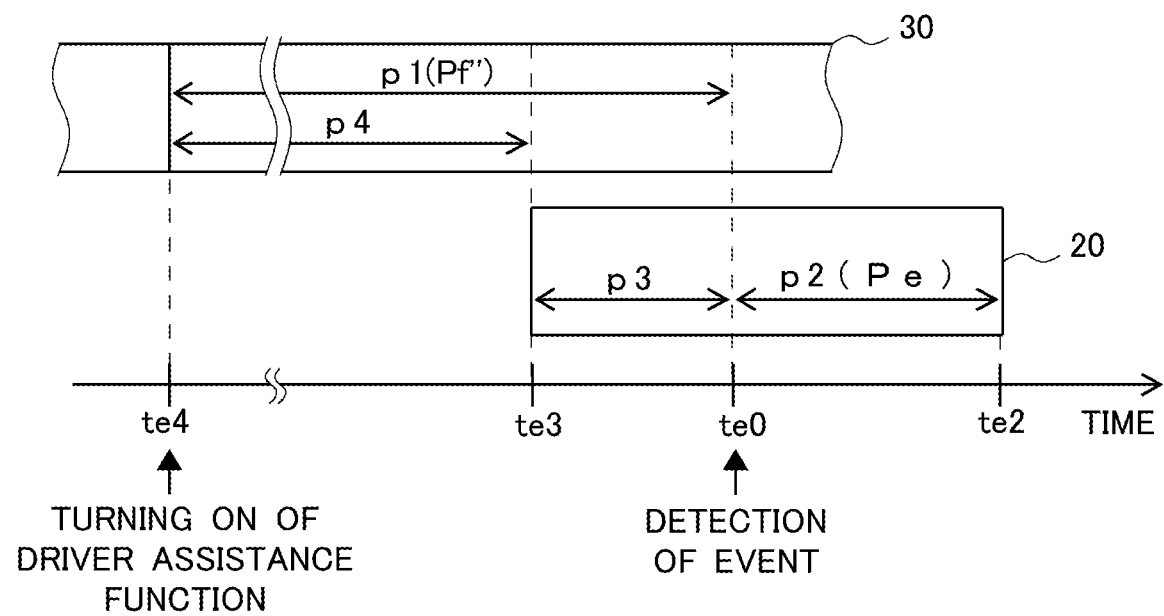
FIG. 20 shows a relationship between a file outputted by the recording control device 1110 and time according to a ninth embodiment.

The recording control device 1110 according to the ninth embodiment will be described with reference to FIG. 20. FIG. 20 shows a relationship between a file outputted by the recording control device 1110 according to the ninth embodiment and time. FIG. 20 includes a file 30 and a file 20. The file 30 is a shot file generated from the buffer memory 112. The file 30 includes a shot file generated at a preset frame rate while a driver assistance function is operating. For example, the frame rate of the file 30 may be lower than a frame rate of an ordinary shot file. More specifically, for example, the frame rate of the file 30 may be 1 fps, 2 fps, or the like. Note that a frame rate of video data acquired by the shot data acquisition unit 111 is, for example, 15 to 30 fps.

The video processing unit 113 generates the file 30 from shot data stored in the buffer memory 112. The video processing unit 113 may sequentially extract and store shot data stored in the buffer memory 112 in every preset period. At that time, the video processing unit 113 may store the sequentially extracted shot data into a preset area within the buffer memory 112. The video processing unit 113 may store the sequentially extracted shot data into an area set within the recording unit 140. The video processing unit 113 may store the sequentially extracted shot data into another memory provided within the recording control device 1110. In this case, an area where the file 30 is stored can be referred to as a buffer memory. The file 30 stored in the buffer memory may be deleted when a driver assistance function is turned off or when traveling of the vehicle is stopped.

When it is detected that a driver assistance function starts operating, the recording control unit 214 of the recording apparatus 1100 according to the ninth embodiment starts storing the file 30. In FIG. 20, the vehicle information acquisition unit 215 detects at time te4 that a driver assistance function starts operating. Then, the recording control unit 214 causes the video processing unit 113 to store the file 30. That is, the recording apparatus 1100 according to the ninth embodiment temporarily stores shot data obtained for the fourth period p4 before an event is detected. Note that the file 30 may be included in an ordinary shot file described with reference to FIG. 2. The file 30 may be generated in parallel with an ordinary shot file.

If the event detection unit 115 detects occurrence of an event and if the vehicle information acquisition unit 215 detects that the driver assistance function was operating (AST: ON) when the event occurred, the recording control unit 214 determines that the first period p1 is a period Pf". That is, the recording control unit 214 causes the video processing unit 113 to generate shot data obtained for a period from the time te4 to time te2 as an event shot file. Note that the period Pf" is longer than the period Ps, which is the first period in a case where the driver assistance function was not operating, similarly to the case of the recording apparatus 1100 according to the seventh embodiment, as a matter of course. The event shot file is generated from shot data obtained for the fourth period p4 included in the previously stored file 30 and shot data obtained for the third period p3 and the second period p2 included in the buffer memory 112.

With a configuration as described above, the recording apparatus 1100 according to the ninth embodiment can set the fourth period p4, which is a period preceding the preset third period p3, depending on an operating state of the driver assistance function. Thus, the recording apparatus 1100 according to the ninth embodiment can appropriately record incidents before and after occurrence of an event.

Driver assistance functions to which the above-described ninth embodiment is applied are not limited. However, the ninth embodiment is particularly suitable for driver assistance functions that keep functioning for a relatively long time. The driver assistance functions that keep functioning for a relatively long time include, for example, an autocruise function, an automated driving function, and the like.

Note that the present invention is not limited to the above-described embodiments, and changes can be made as appropriate without departing from the scope of the present invention. For example, the recording apparatus 1100 may be configured in a form that includes the recording control device 1110 and the camera 120 but does not include the recording unit 140. In this case, the recording apparatus 1100 and the recording unit 140 only need to be communicably connected to each other. Similarly, the recording apparatus 1100 may be configured in a form that includes the recording control device 1110 and the recording unit 140 but does not include the camera 120. In this case, the recording apparatus 1100 and the camera 120 only need to be communicably connected to each other.

Various types of non-transitory computer readable media can be used to store the recording control program and provide the recording control program to a computer. The non-transitory computer readable media include various types of tangible storage media. Examples of the non-transitory computer readable media include magnetic storage media (for example, flexible disk, magnetic tape, and hard disk drive), magneto-optical storage media (for example, magneto-optical disk), CD-ROM (Read Only Memory), a CD-R, a CD-R/W, and semiconductor memories (for example, mask ROM, PROM (Programmable ROM), EPROM (Erasable PROM), flash ROM, and RAM (random access memory)). Various types of transitory computer readable media may also be used to provide the recording control program to a computer. Examples of the transitory computer readable media include an electrical signal, an optical signal, and electromagnetic waves. The transitory computer readable media can provide the recording control program to the computer through any of wired communication channels, such as a cable and optical fiber, or a wireless communication channel.

The invention of the present application has been described with reference to embodiments. However, the invention is not limited by the foregoing description. Various changes understandable by those ordinarily skilled in the art within the scope of the invention can be made to the configurations and the specifics of the invention.

The recording control device according to any of the embodiments is applicable to, for example, acquisition of video of surroundings of a traveling vehicle.

What is claimed is:

1. A recording control device comprising:
   a buffer memory configured to temporarily store the data on the video; and
   at least one processor configured to execute software to:
      acquire data on a video obtained by shooting an outside of a vehicle, the data on the video having a first frame rate;
      detect occurrence of an event;
      acquire traveling information on the vehicle;
      determine, based on the traveling information, a first period, which is a period preceding a time point of detection of the event, and record, based on the detection of the event, the data on the video, among the data on the video stored in the buffer memory, obtained from a time point as far back as the first period before the time point of detection of the event until a time point at which a second period has passed since the time point of detection of the event;
      acquire vehicle information including an operating state of a driver assistance function of the vehicle;
      when the driver assistance function of the vehicle is operating when the occurrence of the event is detected:
         set the first period to be longer than when that the driver assistance function is not operating; and
         control recording of the data on the video, wherein controlling the recording of the data on the video comprises controlling recording of the data on the video obtained for a fourth period, which is a period within the first period from a starting time point of the first period to a starting time point of a third period, at a second frame rate that is lower than the first frame rate, and controlling of the video data obtained for the third period, which is a period within the first period from the time point of detection of the event to a time point as far back as a preset period before the time point of detection of the event at the first frame rate; and
      output the data on the video to the recording memory.

2. The recording control device according to claim 1, wherein the at least one processor is further configured to the fourth period to be a period from a time point at which the driver assistance function starts operating to the starting time point of the third period.

3. The recording control device according to claim 1, wherein the at least one processor is further configured to output type information on the driver assistance function in an operating state, along with the data on the video, to the recording memory.

4. A recording apparatus comprising:
   the recording control device according to claim 1; and
   at least one of camera configured to shoot the video and the recording memory configured to record the data on the video.

5. A recording control method comprising:
   acquiring video data that is data on a video obtained by shooting an outside of a vehicle, the data on the video having a first frame rate;
   temporarily storing the video data;
   detecting occurrence of an event;
   acquiring traveling information on the vehicle;
   based on the traveling information, determining a first period, which is a period preceding a time point of detection of the event, and based on the detection of the event, recording the video data, among the stored video data, obtained from a time point as far back as the first period before the time point of detection of the event until a time point at which a second period has passed since the time point of detection of the event;
   acquiring vehicle information including an operating state of a driver assistance function of the vehicle;
   when the driver assistance function of the vehicle is operating when the occurrence of the event is detected:
      setting the first period to be longer than when that the driver assistance function is not operating; and
      controlling recording of the data on the video, wherein controlling the recording of the data on the video comprises controlling recording of the data on the video obtained for a fourth period, which is a period within the first period from a starting time point of the first period to a starting time point of a third period, at a second frame rate that is lower than the first frame rate, and controlling of the video data obtained for the third period, which is a period within the first period from the time point of detection of the event to a time point as far back as a preset period before the time point of detection of the event at the first frame rate; and
   outputting the data on the video to the recording memory.

6. A non-transitory computer readable medium storing recording control program causing a computer to perform:
   acquiring video data that is data on a video obtained by shooting an outside of a vehicle, the data on the video having a first frame rate;
   temporarily storing the video data;
   detecting occurrence of an event;
   acquiring traveling information on the vehicle;
   based on the traveling information, determining a first period, which is a period preceding a time point of detection of the event, and based on the detection of the event, recording the video data, among the stored video data, obtained from a time point as far back as the first period before the time point of detection of the event until a time point at which a second period has passed since the time point of detection of the event;
   acquiring vehicle information including an operating state of a driver assistance function of the vehicle;
   when the driver assistance function of the vehicle is operating when the occurrence of the event is detected:
      setting the first period to be longer than when that the driver assistance function is not operating; and
      controlling recording of the data on the video, wherein controlling the recording of the data on the video comprises controlling recording of the data on the video obtained for a fourth period, which is a period within the first period from a starting time point of the first period to a starting time point of a third period, at a second frame rate that is lower than the first frame rate, and controlling of the video data obtained for the third period, which is a period within the first period from the time point of detection of the event to a time point as far back as a preset period before the time point of detection of the event at the first frame rate; and outputting the data on the video to the recording memory.

\* \* \* \* \*